(12) United States Patent
Yamaoka et al.

(10) Patent No.: US 7,757,164 B2
(45) Date of Patent: Jul. 13, 2010

(54) PAGE INFORMATION COLLECTION PROGRAM, PAGE INFORMATION COLLECTION METHOD, AND PAGE INFORMATION COLLECTION APPARATUS

(75) Inventors: Yuji Yamaoka, Kawasaki (JP); Yuko Nakayama, Kawasaki (JP); Ikuya Morikawa, Kawasaki (JP); Hisashi Kojima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 909 days.

(21) Appl. No.: 11/066,541

(22) Filed: Feb. 28, 2005

(65) Prior Publication Data
US 2006/0041827 A1  Feb. 23, 2006

(30) Foreign Application Priority Data
Aug. 17, 2004 (JP) ............................ 2004-237551

(51) Int. Cl.
*G06F 17/00* (2006.01)
(52) U.S. Cl. ...................................... 715/234; 715/200
(58) Field of Classification Search ................ 715/200, 715/234, 277, 206–209, 253–255; 709/201–203, 709/217, 219
See application file for complete search history.

(56) References Cited

U.S. PATENT DOCUMENTS

| | | | | |
|---|---|---|---|---|
| 6,259,956 | B1 * | 7/2001 | Myers et al. .................... 700/80 |
| 6,393,437 | B1 * | 5/2002 | Zinda et al. ................... 707/201 |
| 6,418,433 | B1 * | 7/2002 | Chakrabarti et al. ............ 707/5 |
| 6,584,569 | B2 | 6/2003 | Reshef et al. ................. 726/25 |
| 6,983,282 | B2 * | 1/2006 | Stern et al. ................... 707/102 |
| 6,983,320 | B1 * | 1/2006 | Thomas et al. .............. 709/224 |
| 7,013,323 | B1 * | 3/2006 | Thomas et al. .............. 709/203 |
| 7,194,469 | B1 * | 3/2007 | Dowd et al. .................... 707/10 |
| 2001/0047375 | A1 * | 11/2001 | Fest ........................... 707/526 |

(Continued)

FOREIGN PATENT DOCUMENTS

WO    WO 00/26836    5/2000

(Continued)

OTHER PUBLICATIONS

Macropool, ContentSaver (software), Feb. 9, 2003, macropool, pp. 1-9.*

(Continued)

*Primary Examiner*—Cesar B. Paula
*Assistant Examiner*—Manglesh M Patel
(74) *Attorney, Agent, or Firm*—Fujitsu Patent Center

(57) ABSTRACT

A page information collection program for efficiently collecting pages required to verify a web site. When a page acquisition request is input, a page acquisition section acquires the contents of a page and creates page information including the contents of the page and communication information used to acquire the page. Next, a classification section stores the page information put into a group in accordance with an assignment determination condition. If the target page information does not satisfy the assignment determination condition of any group, a grouping section creates an assignment determination condition satisfied by the target page information and a corresponding group, and stores the page information put into the created group. A page acquisition request section outputs a page acquisition request based on the link information in the page information put into the group created by the grouping section, to the page acquisition section.

11 Claims, 25 Drawing Sheets

U.S. PATENT DOCUMENTS

| | | | |
|---|---|---|---|
| 2004/0019611 A1* | 1/2004 | Pearse et al. | 707/104.1 |
| 2004/0205076 A1* | 10/2004 | Huang et al. | 707/100 |
| 2005/0071310 A1* | 3/2005 | Eiron et al. | 707/1 |
| 2005/0216886 A1* | 9/2005 | Washburn | 717/110 |

FOREIGN PATENT DOCUMENTS

| | | |
|---|---|---|
| WO | WO 01/35617 | 5/2001 |
| WO | WO 01/86545 | 11/2001 |

OTHER PUBLICATIONS

Patent Abstracts of Japan, Publication No. 2001-051839, Published Feb. 23, 2001.
Patent Abstracts of Japan, Publication No. 2002-318511, Published Oct. 31, 2002.
Patent Abstracts of Japan, Publication No. 2003-015870, Published Jan. 17, 2003.
Patent Abstracts of Japan, Publication No. 2004-102743, Published Apr. 2, 2004.

* cited by examiner

131 PAGE-CLASS HOLDING BLOCK

| PAGE CLASS ID | ASSIGNMENT-DETERMINATION PRIORITY LEVEL | ASSIGNMENT DETERMINATION CONDITION | SET OF IDS OF ASSIGNED PAGE INFORMATION | ID USED TO REACQUIRE PAGE INFORMATION |
|---|---|---|---|---|
| PC1 | 7 | ... | HD1<br>HD2<br>HD7 | HD1 |
| PC2 | 5 | ... | HD3<br>HD5 | HD3 |
| ... | ... | ... | ... | |

FIG. 7

133 PAGE INFORMATION GROUP

| PAGE INFORMATION ID | CONNECTION DATA | REQUEST DATA | RESPONSE DATA |
|---|---|---|---|
| HD1 | URL: http:// foo /XXX<br>Proxy: 192.168.0.1:8080<br>... | GET / HTTP/1.0 | HTTP/1.0 200 OK<br>Content - Length: 3495<br>Content - Type: text/html<br>... |
| HD2 | URL: http://bar.net:8080/YYY<br>Proxy: NONE<br>... | POST /YYY HTTP/1.1<br>Host: bar.net:8080<br>Content - Length: 8<br>... | HTTP/1.0 404 Not Found<br>Content - Length: 0 |
| ... | ... | ... | ... |

FIG. 8

☒ CONSIDER (REQUESTED) URL CONFORMITY — 31

URL: [_____] — 31a

☐ CONSIDER FOLLOWING QUERY CONFORMITY — 31b
QUERY [_____] — 31ba
○ SET OF QUERY PARAMETERS — 31bb
○ SET OF QUERY PARAMETER NAMES — 31bc
○ SET OF SPECIFIED QUERY PARAMETERS AND SET OF QUERY PARAMETER NAMES — 31bd

☒ CONSIDER RESPONSE STATUS CODE — 32
RESPONSE STATUS CODE: [_____] — 32a

☒ CONSIDER LINK INFORMATION IN RESPONSE — 33
LINK INFORMATION:

| URL — 33a | QUERY — 33b |
|---|---|
|  |  |

☒ CONSIDER FOLLOWING QUERY CONFORMITY — 33c
○ SET OF QUERY PARAMETERS — 33ca
○ SET OF QUERY PARAMETER NAMES — 33cb
◉ SET OF SPECIFIED QUERY PARAMETERS AND SET OF QUERY PARAMETER NAMES — 33cc

☒ JUDGE CONFORMITY BY SET — 33d

SPECIFIED QUERY PARAMETER NAME:
— 34
action

[ OK ] — 35    [ CANCEL ] — 36

FIG. 11

49 RESPONSE

```
HTTP/1.0 200 OK
Content-Length: 389

<html>
<head>
<title>
sample.com
</title>
</head>
<body>
<p>
See the <a href="foo.cgi?date=1">today's schedule</a>

<p>
See the <a href="foo.cgi?date=2">tomorrow's schedule</a>

<p>
<from action="bar.cgi" method="POST">
<select name="action">View
<option value="view">View
<option value="edit">Edit
</select>
schedule.
<input type="submit">
</form>

</body>
</html>
```

FIG. 13

☒ CONSIDER (REQUESTED) URL CONFORMITY — 31

URL: http://www.sample.com — 31a

☒ CONSIDER FOLLOWING QUERY CONFORMITY — 31b

QUERY: — 31ba

○ SET OF QUERY PARAMETERS — 31bb
○ SET OF QUERY PARAMETER NAMES — 31bc
○ SET OF SPECIFIED QUERY PARAMETERS AND SET OF QUERY PARAMETER NAMES — 31bd

☒ CONSIDER RESPONSE STATUS CODE — 32

RESPONSE STATUS CODE: 200 — 32a

☒ CONSIDER LINK INFORMATION IN RESPONSE — 33

LINK INFORMATION

| URL — 33a | QUERY — 33b |
|---|---|
| http://www.sample.com/foo.cgi | date=1 |
| http://www.sample.com/foo.cgi | date=2 |
| http://www.sample.com/bar.cgi | action=view |
| http://www.sample.com/bar.cgi | action=edit |

☒ CONSIDER FOLLOWING QUERY CONFORMITY — 33c

○ SET OF QUERY PARAMETERS — 33ca
○ SET OF QUERY PARAMETER NAMES — 33cb
◎ SET OF SPECIFIED QUERY PARAMETERS AND SET OF QUERY PARAMETER NAMES — 33cc

☒ JUDGE CONFORMITY BY SET — 33d

SPECIFIED QUERY PARAMETER NAME:

action — 34

[ OK ] — 35   [ CANCEL ] — 36

FIG. 14

PAGE INFORMATION COLLECTION PROGRAM, PAGE INFORMATION COLLECTION METHOD, AND PAGE INFORMATION COLLECTION APPARATUS

CROSS-REFERENCE TO RELATED APPLICATIONS

This application is based on, and claims priority to, Japanese Application No. 2004-237551, filed on Aug. 17, 2004, in Japan, and which is incorporated herein by reference.

BACKGROUND OF THE INVENTION

1. Field of the Invention

The present invention relates to page information collection programs, page information collection methods, and page information collection apparatuses for collecting page information from a web site, and particularly to page information collection programs, page information collection methods, and page information collection apparatuses for collecting page information controlled by a web application.

2. Description of the Related Art

If a web site is built, each page in the web site must be verified to see whether it has been created as planned. It would be hard to manually verify a massive web site or a web site having a complicated structure because of heavy use of web applications or the like. Therefore, systems have been designed to automatically verify a web site by performing automatic input to input fields in the web site and the like.

An automatic web-site verification system automatically collects information of each page in a target web site. Page collection is important if a web site is tested while the entire configuration of data and programs or web applications of the web site is not known.

One page may be recognized as a concrete target of an entry test only after page collection, for instance. Pages are often organized in such a manner that page B can be acquired just by using random data obtained on page A. A page that can be acquired only after log-in is an example. Each time page B is tested, page A must be acquired, so that a technology for automatically acquiring both page A and page B is desired.

A system has been provided to collect pages that can be referenced by following links from a given page in a web site. The user first enters information of a hyper text transfer protocol (HTTP) request for acquiring a base page. The system issues the HTTP request, analyzes an HTTP response, and creates an HTTP request group just from a group of new link information found in link information groups included in the HTTP response. The processing of issuing a request, analyzing a response, and creating a request group is repeated until all the HTTP request groups are issued. The response analysis and the subsequent processing can be cancelled for a page which can be reached by following a given number of links from the base page (refer to U.S. Pat. No. 6,584,569).

In page collection from a web site including web applications, these trade-offs must be considered: If a great number of links are followed, an enormous number of pages must be collected, providing an excessively heavy processing load; if a reduced number of links are followed, a great number of pages are missed, lowering the reliability of web-site verification.

Redundant page collection is avoided by following just a link appearing for the first time in the link information included in the collected page information. Whether a certain link is found for the first time is determined by comparing a combination of a uniform resource locator (URL) and a parameter including a query parameter, for instance. If the URL and the common-gateway-interface (CGI) query parameter of the target link information match those of the link information of a page acquired before, it is determined that the link information has ever been followed. A page indicated by the old link information will not be collected.

If the conformity of link information is judged just by an exact match of the combination of a URL and a parameter including a query parameter, a great number of similar pages would be collected. Suppose that a scheduler web site uses link information such as /foo.cgi?date=1 and /foo.cgi?date=2 to display user's timetable of a given day. The date is specified as the value of the query parameter in the link information. Because the pages for displaying the timetable of a day have the same structure, the pages of all dates need not be acquired. However, if exact matching for a combination of a URL and a parameter including a query parameter is performed to judge the conformity of link information, the pages of all dates would be acquired. As a result, a great amount of unnecessary page verification would decrease the processing efficiency of the system.

If the query parameter value is not compared, the pages of all dates will not be acquired with link information such as /foo.cgi?date=1 and /foo.cgi?date=2. This, however, can prevent a page having a different structure depending on the query parameter value from being collected even though such page should be checked.

Suppose that the link information to a page for viewing a specified timetable is /bar.cgi?action=view and that the link information to a page for editing a timetable is /bar.cgi?action=edit. The view page and the edit page have different page structures and must be collected as different pages to be verified.

If the link information is compared not in terms of the query parameter value but in terms of the combination of the URL and the query name, /bar.cgi?action=view and /bar.cgi?action=edit are assumed to be the same link information. Just either the view page or the edit page is acquired, and the other page that should be verified is missed.

Accordingly, a system which can collect all pages that should be checked and can minimize redundant collection of pages having identical data structures has been awaited.

Reacquisition of an identical page may be required in automatic web-site verification. A system for reacquiring a page stores the HTTP request issued for page collection, for instance. When the user specifies a page by entering an item such as a URL, the system issues the request that was used to acquire the page. Then, the system receives a response to the issued request and outputs the response.

If a significant HTTP request is output just by sending a plurality of HTTP requests in a given procedure (transaction processing, for instance), the system for reacquiring a page cannot reacquire a correct page. The system cannot automatically recognize the failure of page reacquisition and cannot automatically locate the request causing the failure. Consequently, manual verification must be conducted, putting an excessive load on the user.

SUMMARY OF THE INVENTION

In view of the foregoing, it is an object of the present invention to provide a page information collection program, a page information collection method, and a page information collection apparatus which can efficiently collect pages necessary for verifying a web site.

To accomplish the above object, according to the present invention, there is provided a page information collection program for colleting a set of pages associated by link information, from a server on a network. This page information collection program causes a computer to execute the processing of acquiring the contents of a page through the network in response to a page acquisition request and creating page information including the contents of the page and the communication information used for page acquisition, by means of a page acquisition section; taking the page information created by the page acquisition section as target page information, comparing an assignment determination condition defining the requirements of page information to be included in each group and the target page information, to find a group having the assignment determination condition satisfied by the target page information, and storing the target page information put into the group in a storage section, by means of a classification section; creating an assignment determination condition satisfied by the target page information if the target page information does not satisfy the assignment determination condition of any group, creating a group corresponding to the created assignment determination condition, and storing the target page information put into the created group in the storage section, by means of a grouping section; and extracting the link information from the target page information put into the group created by the grouping section and outputting a request for acquiring the page based on the extracted link information to the page acquisition section, by means of a page acquisition request section.

To accomplish the above object, there is also provided a page information collection method for collecting a set of pages associated by link information from a server on a network, by means of a computer. This page information collection method includes the steps of acquiring the contents of a page through the network in response to a page acquisition request and creating page information including the contents of the page and the communication information used for page acquisition, by means of a page acquisition section; taking the page information created by the page acquisition section as target page information, comparing an assignment determination condition defining the requirements of page information to be included in each group and the target page information, to find a group having the assignment determination condition satisfied by the target page information, and storing the target page information put into the group in a storage section, by means of a classification section; creating an assignment determination condition satisfied by the target page information if the target page information does not satisfy the assignment determination condition of any group, creating a group corresponding to the created assignment determination condition, and storing the target page information put into the created group in the storage section, by means of a grouping section; and extracting the link information from the target page information put into the group created by the grouping section and outputting a request for acquiring the page based on the extracted link information to the page acquisition section, by means of a page acquisition request section.

To accomplish the above object, there is further provided a page information collection apparatus for collecting a set of pages associated by link information, from a server on a network. This page information collection apparatus includes a page acquisition section for acquiring the contents of a page through the network in response to a page acquisition request and creating page information including the contents of the page and the communication information used for page acquisition; a classification section for taking the page information created by the page acquisition section as target page information, comparing an assignment determination condition defining the requirements of page information to be included in each group and the target page information, to find a group having the assignment determination condition satisfied by the target page information, and storing the target page information put into the group in a storage section; a grouping section for creating an assignment determination condition satisfied by the target page information if the target page information does not satisfy the assignment determination condition of any group, creating a group corresponding to the created assignment determination condition, and storing the target page information put into the created group in the storage section; and a page acquisition request section for extracting the link information from the target page information put into the group created by the grouping section and outputting to the page acquisition section a request for acquiring the page based on the extracted link information.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 7 shows a sample data structure in a page-class holding block.

FIG. 8 shows a sample data structure of a page information group.

FIG. 11 shows a displayed sample of an assignment-determination-condition creation rule.

FIG. 13 shows a sample response.

FIG. 14 shows a sample assignment determination condition.

DESCRIPTION OF THE PREFERRED EMBODIMENTS

An embodiment of the present invention will be explained below with reference to the drawings.

An overview of the present invention will be given first, and then the embodiments will be described in detail.

Figure 1:
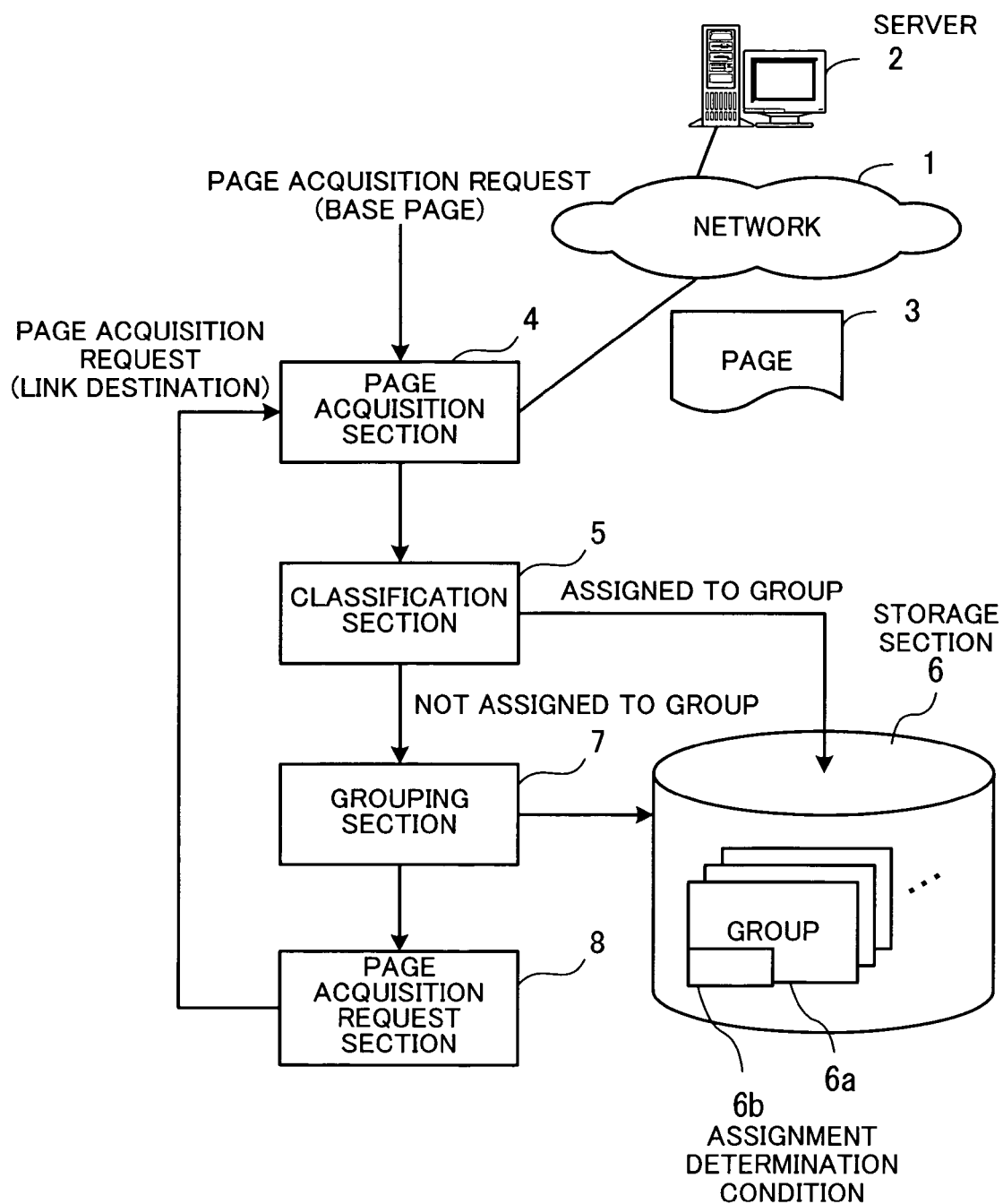
FIG. 1 shows the concept of the present invention applied to an embodiment.

FIG. 1 shows the concept of the present invention. A page acquisition section 4, a classification section 5, a storage section 6, a grouping section 7, and a page acquisition request section 8 are provided to collect a set of pages 3 associated by link information, from a server 2 on a network 1.

The page acquisition section 4 acquires the contents of a page 3 through the network 1 in response to a page acquisition request, and generates page information, including the contents of the page 3 and communication information used for page acquisition. The communication information includes a request for acquiring the page 3, sent to the server 2, header information included in a response to the request, output by the server 2, and others.

The classification section 5 takes the page information created by the page acquisition section 4 as target page information. The classification section 5 compares an assignment determination condition 6b defining requirements of page information to be included in a corresponding group 6a, with the target page information, and finds a group having the assignment determination condition 6b satisfied by the target page information. Then, the classification section 5 stores the target page information put into the group in the storage section 6.

If the page information does not satisfy the assignment determination condition of any group, the grouping section 7 generates an assignment determination condition satisfied by the page information. Then, the grouping section 7 creates a group corresponding to the new assignment determination condition and stores the page information put into the group in the storage section 6.

The page acquisition request section 8 extracts link information from the page information put into the group created by the grouping section 7 and outputs to the page acquisition section 4 a page acquisition request based on the extracted link information. A page linked from the acquired page information is acquired in response to the page acquisition request output from the page acquisition request section 8.

When a page acquisition request for a base page such as the top page of a web site is given, for instance, the page acquisition section 4 acquires the contents of the page 3 through the network 1 and creates page information, including the contents of the page 3 and communication information used for page acquisition.

The classification section 5 then takes the page information created by the page acquisition section 4 as target page information, and compares it with the assignment determination condition 6b. When the page information of a base page is acquired, the corresponding group has not yet been created. Accordingly, the grouping section 7 creates a new assignment determination condition satisfied by the page information and also creates a new group corresponding to the created assignment determination condition. The page information is put into the new group created by the grouping section 7 and is stored in the storage section 6.

The page acquisition request section 8 then extracts link information from the page information put into the new group created by the grouping section 7 and outputs a page acquisition request based on the extracted link information, to the page acquisition section 4.

The page acquisition section 4 then acquires page information of a linked page. If the acquired page information satisfies the assignment determination condition 6b of any group 6a, the page information is put into the group and stored in the storage section 6.

If the acquired page information does not satisfy the assignment determination condition of any group, the grouping section 7 creates another new group. The page acquisition request section 8 then extracts link information from the page information put into the new group and outputs a page acquisition request based on the link information.

A page linked from page information is acquired only when the page information is put into a new group, so that redundant collection of pages having a high conformity with one another can be avoided. Accordingly, the pages on the server 2 can be efficiently collected.

The collected page information can be effectively used to verify the data of the web site built on the server 2. When a web site is built, it must be verified whether web pages are correctly associated with one another. This verification requires collection of web pages, performed by following links between web pages.

If all pages are collected regardless of conformity between pages, redundant verification is required. According to the present invention, redundant page collection can be avoided because links from a page will not be followed if the page has a high conformity with a page acquired earlier.

An embodiment of the present invention will next be described, taking an application of the present invention to a web-site verification apparatus as an example.

Figure 2:
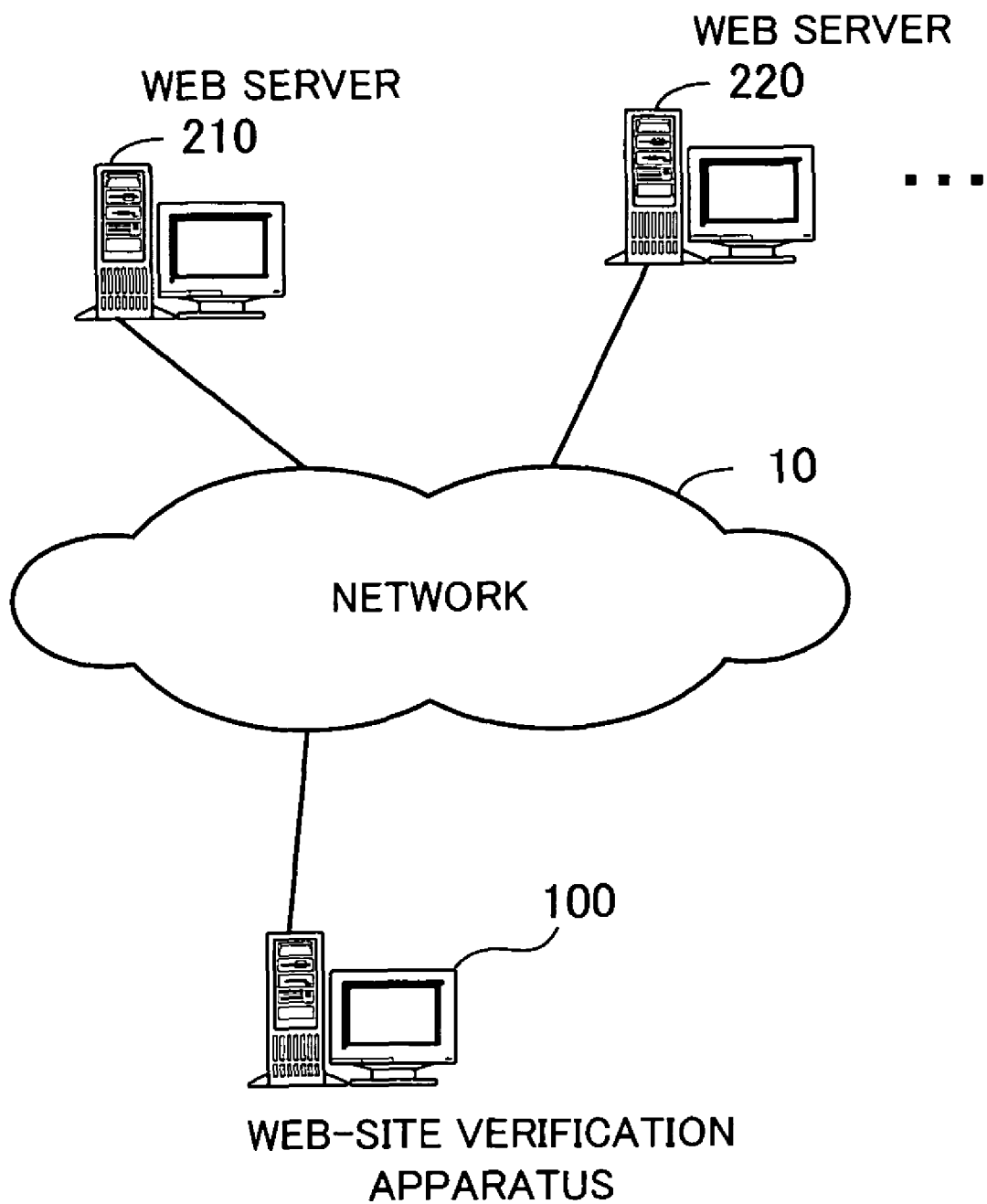
FIG. 2 shows a system configuration of the embodiment.

FIG. 2 shows a system configuration of the embodiment. A web-site verification apparatus 100 is connected to web servers 210, 220, and the like, via a network 10. The web-site verification apparatus 100 collects web pages such as HTTP data stored in the web servers 210, 220, and the like, and verifies whether the pages are created as planned.

Figure 3:
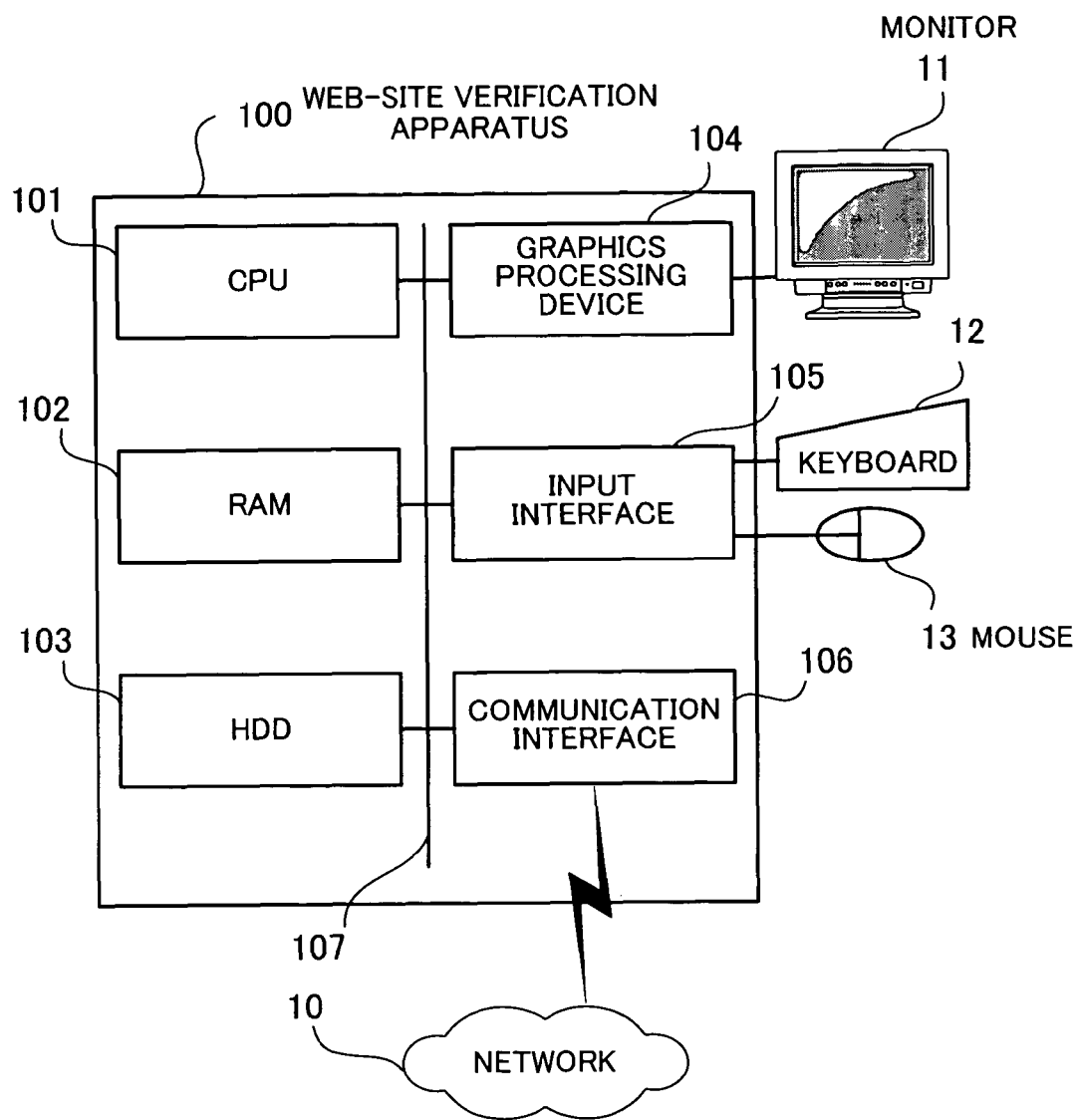
FIG. 3 shows a sample hardware configuration of a web-site verification apparatus.

FIG. 3 shows a sample hardware configuration of the web-site verification apparatus 100. The whole of the web-site verification apparatus 100 is controlled by a central processing unit (CPU) 101. The CPU 101 is connected to a random access memory (RAM) 102, a hard disk drive (HDD) 103, a graphics processing device 104, an input interface 105, and a communication interface 106, via a bus 107.

The RAM 102 temporarily stores at least a part of an application program and the operating system (OS) to be executed by the CPU 101. The RAM 102 also stores a variety of data necessary for the processing by the CPU 101. The HDD 103 stores the OS and the application program.

The graphics processing device 104 is connected to a monitor 11. The graphics processing device 104 displays an image on the screen of the monitor 11 under instructions from the CPU 101. The input interface 105 is connected to a keyboard 12 and a mouse 13. The input interface 105 sends a signal sent from the keyboard 12 or the mouse 13, through the bus 107 to the CPU 101.

The communication interface 106 is connected to the network 10. The communication interface 106 allows data exchange with another computer through the network 10.

With the hardware configuration as described above, the processing function of this embodiment can be implemented. FIG. 3 shows a sample hardware configuration of the web-site verification apparatus 100. The web servers 210, 220, and the like can also be implemented by the same hardware configuration.

Figure 4:
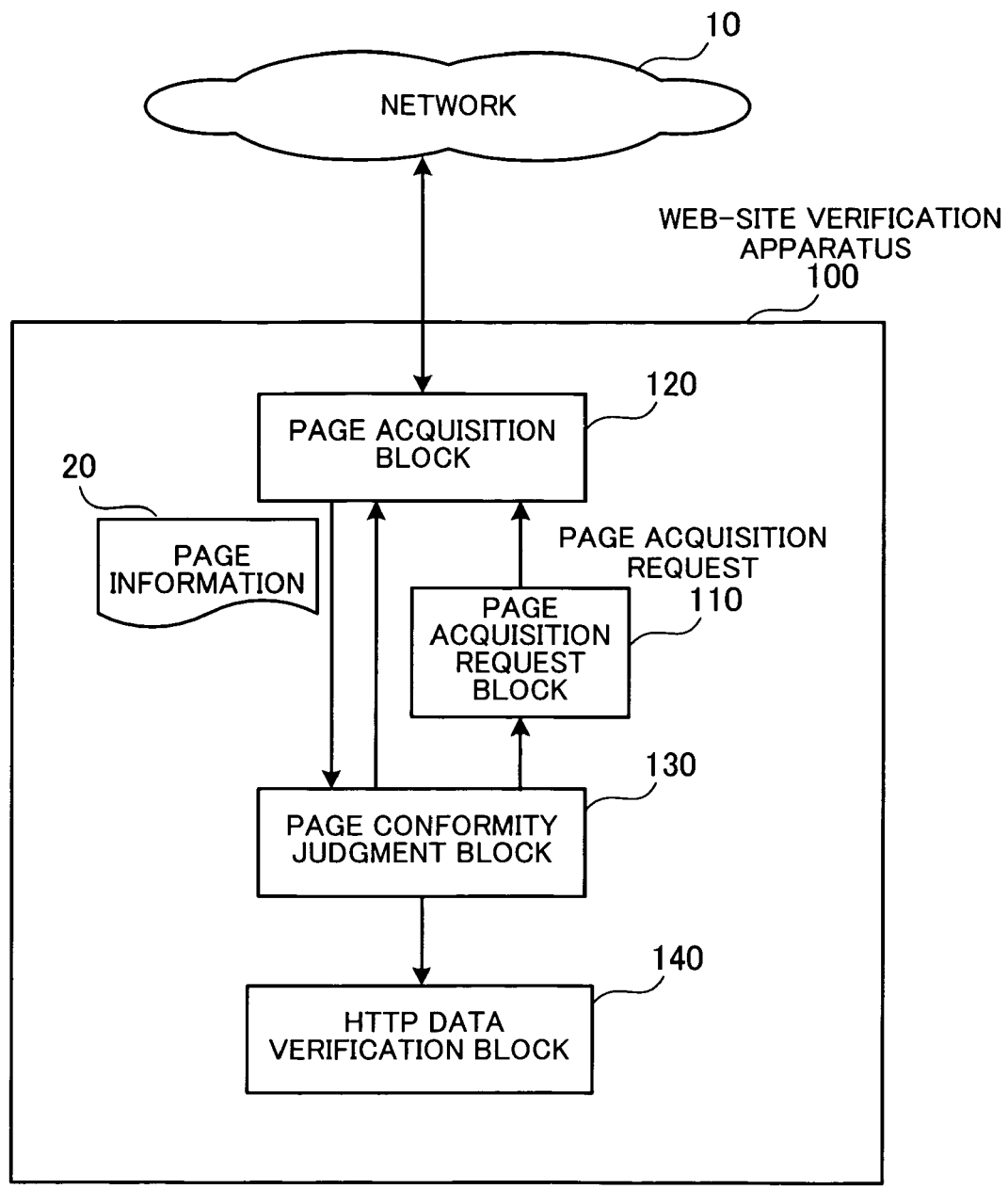
FIG. 4 is a block diagram showing the functions of the web-site verification apparatus.

FIG. 4 is a block diagram showing the functions of the web-site verification apparatus 100. The web-site verification apparatus 100 includes a page acquisition request block 110, a page acquisition block 120, a page conformity judgment block 130, and an HTTP data verification block 140.

The page acquisition request block 110 outputs a page acquisition request to the page acquisition block 120. When the user makes a page collection request specifying the top page of a web site, for instance, the page acquisition request block 110 passes the request for acquiring the specified top page to the page acquisition block 120. If the page conformity judgment block 130 creates a new page class when a page is acquired, the page acquisition request block 110 extracts link information of the acquired page and gives the page acquisition block 120 a request for acquiring a page indicated by the link information.

The page acquisition block 120 acquires a page in response to a request from the page acquisition request block 110. If the target page has ever been acquired, the page acquisition block 120 reacquires the target page by following a predetermined path such as the path followed when the page was acquired before. When a page acquired after log-in processing is reacquired, for instance, an HTTP request for acquiring the page is sent after the log-in processing is performed.

The page acquisition block 120 passes page information 20 related to the acquired page to the page conformity judgment block 130. The page information 20 includes data used for connection, the request, and the response. The contents of the page are included in the response.

When a page is reacquired, the page acquisition block 120 passes the page information 20 to the page conformity judgment block 130 and outputs a conformity judgment request to the page conformity judgment block 130.

The page conformity judgment block 130 puts the acquired page information 20 into a page class. The page class is a set of page information 20 satisfying a certain assignment determination condition. If the acquired page information 20 does not satisfy the assignment determination condition of any page class, the page conformity judgment block 130 creates a new page class and stores the acquired page information 20 in the new page class. If the acquired page information 20 satisfies the assignment determination condition of any existing page class, the page conformity judgment block 130 stores the acquired page information 20 in the page class.

If the page information 20 is given together with a conformity judgment request, the page conformity judgment block 130 judges whether the contents of the page information 20 match those of the information acquired earlier in response to the identical request or whether the information belongs to the same page class, and returns the result of judgment to the page acquisition block 120.

The HTTP data verification block 140 checks whether HTTP data in the page information 20 has been correctly created, based on the acquired page information.

Data collection starts when an instruction to collect the data of a web site is given to the page acquisition request block 110, under the control of the user, for instance. The page acquisition request block 110 manages a page to be acquired from the web site.

Figure 5:
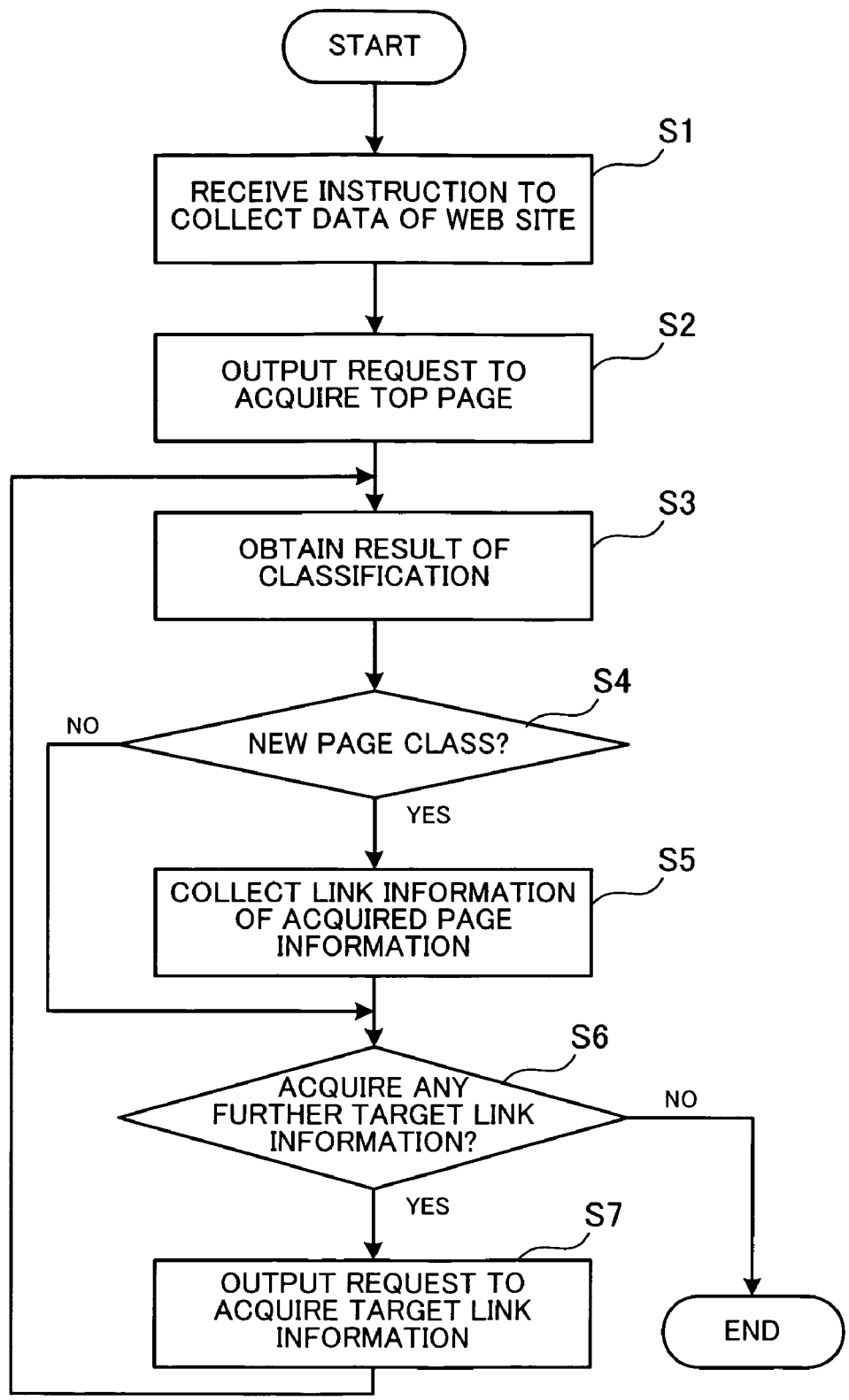
FIG. 5 is a flow chart showing the steps of processing performed by a page acquisition request block.

FIG. 5 is a flow chart showing the steps of processing performed by the page acquisition request block. The steps of the processing will be explained in order of step numbers.

Step S1: The page acquisition request block 110 receives an instruction to collect data of a web site, under the control of the user, for instance. When data in a new web server is verified, a data collection instruction including the URL of the top page of the web site is input.

Step S2: The page acquisition request block 110 outputs a request to acquire the top page to the page acquisition block 120. The page acquisition block 120 acquires the page information 20 of the top page and passes the page information 20 to the page conformity judgment block 130, which puts the page information into a page class. Because the information of the top page is new page information, a new page class is created, and the acquired page information 20 is put into the new page class.

Step S3: The page acquisition request block 110 obtains the classification made by the page conformity judgment block 130.

Step S4: The page acquisition request block 110 checks whether the page information is put into the new page class. If so, the processing proceeds to step S5. If the page information is put into an existing page class, the processing proceeds to step S6.

Step S5: The page acquisition request block 110 analyzes HTTP data included in the acquired page information 20 and lists target link information included in the HTTP data, excluding the link information to a page on a web server other than the target web server.

Step S6: The page acquisition request block 110 checks whether some of the listed target link information has not yet been acquired. If some of the target link information has not yet been acquired, the processing proceeds to step S7. If all the target link information has been acquired, the processing ends here.

Step S7: The page acquisition request block 110 selects one piece of the target link information and outputs a page acquisition request based on the selected link information to the page acquisition block 120. Then, the processing proceeds to step S3. Then, the page acquisition block 120 acquires the page information 20 corresponding to the link information, and the page conformity judgment block 130 classifies the information into page classes. Only when page information 20 acquired in the repeated processing of steps S3 to S6 is classified into a new page class, information of the link from the page information to another page is collected.

Accordingly, links of page information 20 put into an existing page class will not be followed, in this embodiment. Redundant pages will not be collected in web-page collection.

The functions of the page acquisition block 120 and the page conformity judgment block 130 will next be described in further detail. The page acquisition block 120 uses the classification function of the page conformity judgment block 130 when HTTP data is reacquired. So, the HTTP data classification processing performed by the page conformity judgment block 130 will be described prior to the function of the page acquisition block 120.

Figure 6:
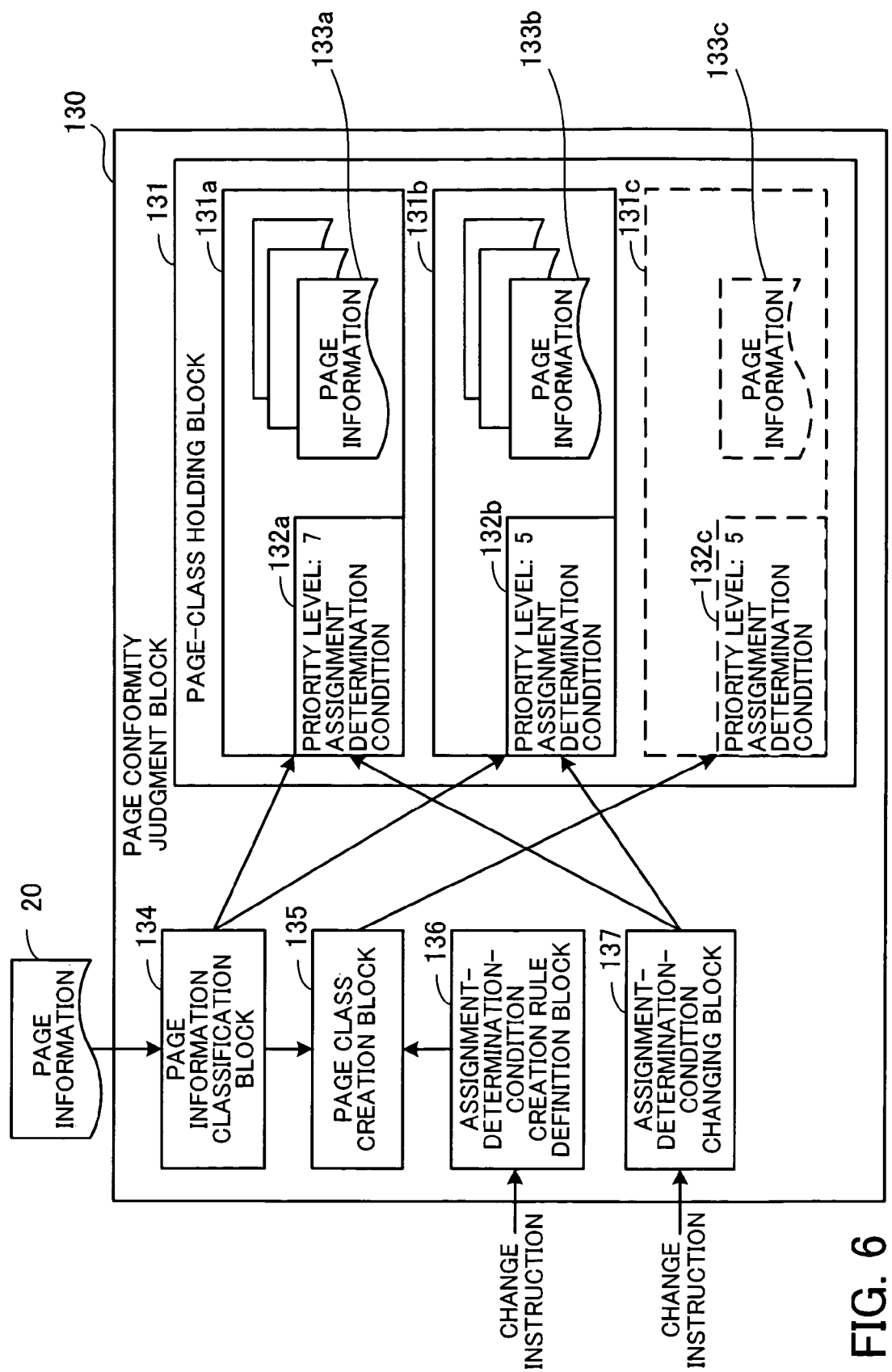
FIG. 6 is a block diagram showing the functions of a page information classification block.

FIG. 6 is a block diagram showing the functions of the page conformity judgment block 130. The page conformity judgment block 130 includes a page-class holding block 131, a page information classification block 134, a page class creation block 135, an assignment-determination-condition creation rule definition block 136, and an assignment-determination-condition changing block 137.

The page-class holding block 131 stores a plurality of page classes 131a, 131b, and 131c. The page classes 131a, 131b, and 131c include corresponding assignment determination conditions 132a, 132b, and 132c and one or more pieces of corresponding page information 133a, 133b, and 133c. The assignment determination conditions 132a, 132b, and 132c are used to determine whether HTTP data belongs to the corresponding page classes 131a, 131b, and 131c.

The assignment determination condition includes a requirement concerning priority. Any HTTP data satisfying the assignment determination conditions of a plurality of page classes is put into a page class in accordance with the priority level. A higher priority value indicates that a higher level of priority is assigned to the corresponding page class.

The page information 133a, 133b, or 133c is the contents of a page put into the corresponding page class 131a, 131b, or 131c.

When page information 20 including the connection data, the request, and the response is input, the page information classification block 134 checks which page class includes the page information 20. The page classes 131a, 131b, and 131c are selected in descending order of priority and checked to see whether the page information 20 satisfies the corresponding assignment determination condition. If the page class which includes the page information 20 is determined, the page information classification block 134 stores the page information 20 in the page class. If no page class includes the page information, the page information classification block 134 outputs a request for creating an assignment determination condition to the page class creation block 135, and passes the page information 20 to the page class creation block 135.

The page class creation block 135 creates a new page class and creates an assignment determination condition for the page class, under an assignment-determination-condition creation rule defined in the assignment-determination-condition creation rule definition block 136.

To be more specific, the page class creation block 135 analyzes the contents of the page information 20 and creates an assignment determination condition by specifying items included in the page information 20 in the corresponding fields under the assignment-determination-condition creation rule. The page class creation block 135 stores a new page class in the page-class holding block 131, specifies the created assignment determination condition, and stores the page information 20 in the new page class.

The assignment-determination-condition creation rule definition block 136 defines a rule for creating an assignment determination condition, in accordance with a user-specified default assignment determination condition. The assignment-determination-condition creation rule definition block 136 also changes the rule for creating an assignment determination condition, under instructions from the user to change the assignment determination condition. The assignment-determination-condition creation rule definition block 136 passes the assignment-determination-condition creation rule by request to the page class creation block 135.

The assignment-determination-condition changing block 137 changes the contents of the assignment determination condition specified for a page class, under instructions from the user to change the assignment determination condition.

Data stored in the page-class holding block 131 will next be described in further detail.

FIG. 7 shows a sample data structure in the page-class holding block 131. The page-class holding block 131 stores a page class ID, an assignment determination priority, an assignment determination condition, a set of IDs of assigned page information, and an ID of page information used for reacquisition, in one page class in association with each other.

The page class ID is a page class identifier. The assignment determination priority represents a level of priority of assignment determination (a greater value represents a higher priority level). The assignment determination condition, which will be described later in further detail, includes requirements for putting page information in the corresponding page class.

The set of IDs of assigned page information contains an identification number of page information included in the page class.

The ID of page information used for reacquisition is an identification number of page information used to reacquire the page information included in the page class. When a reacquisition path (sequence of links to be followed from the base page) is searched for, another page having the information of a link to the page corresponding to the page information represented by the ID of page information used for reacquisition is detected. The reacquisition path passes the detected page.

As shown in FIG. 7, the page-class holding block 131 stores just the ID of page information belonging to each page class and collectively manages the page information as a page information group.

FIG. 8 shows a sample data structure of the page information group. A page information group 133 is stored as a set of page information in which a page information ID, connection data, request data, and response data are associated with one another.

The page information ID is an identification number of stored page information. The connection data is data used when the web server is connected to acquire the page information. The connection data includes the URL, the ID address of the proxy sever, and the like. The request data is the contents of the request sent to the web server in order to acquire the page. The response data is the contents of the response returned from the web server with regard to the request.

The processing performed by the page information classification block 134 will next be described in detail.

Figure 9:
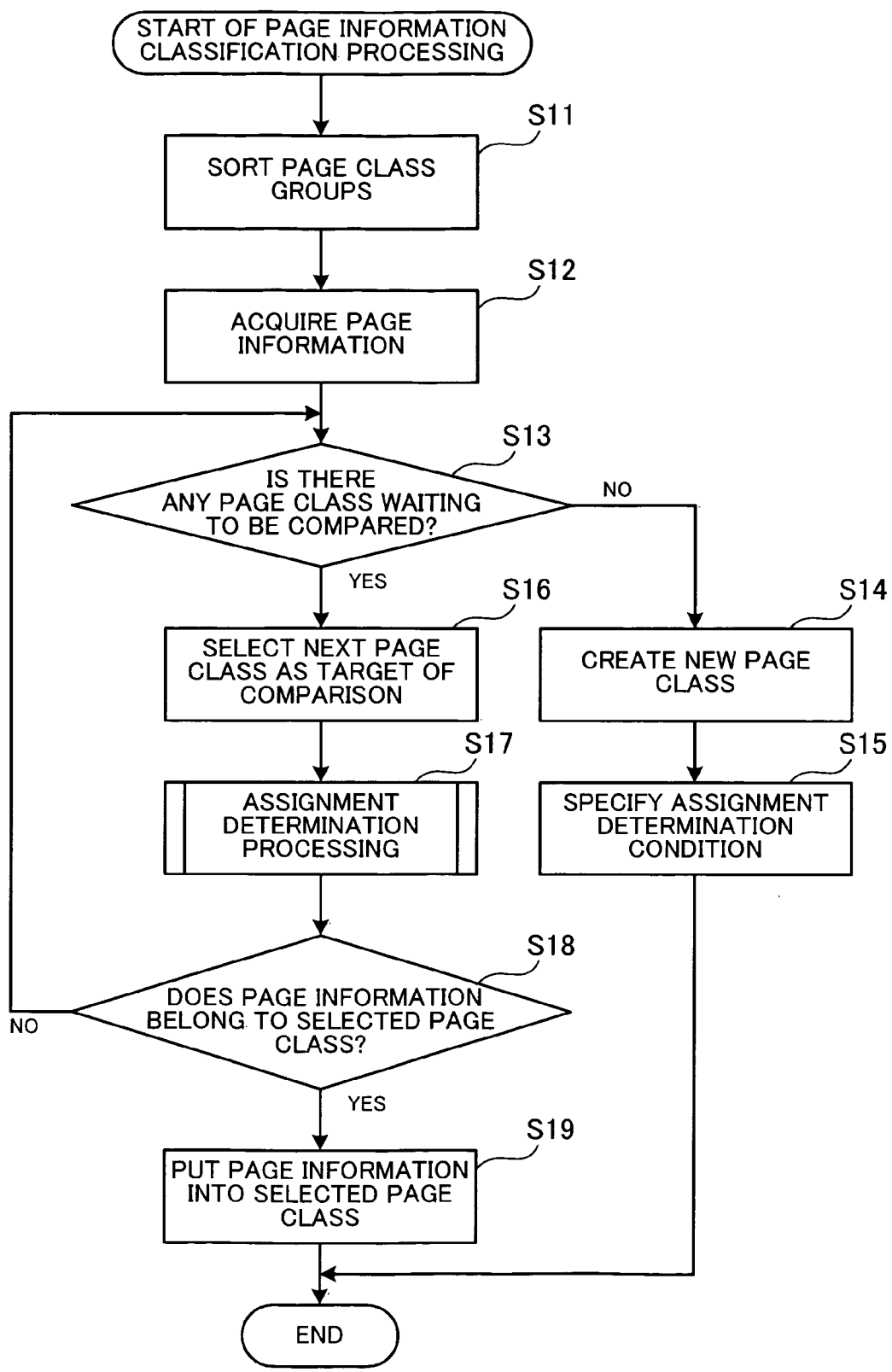
FIG. 9 is a flow chart showing the steps of page information classification processing.

FIG. 9 is a flow chart showing the steps of the page information classification processing. The steps of the processing will be explained in order of step numbers.

Step S11: The page information classification block 134 sorts the page classes according to the priority levels. To be more specific, the page information classification block 134 references the assignment determination conditions of the page classes stored in the page-class holding block 131 and arranges the page classes in descending order of priority level.

Step S12: The page information classification block 134 acquires target page information.

Step S13: The page information classification block 134 checks whether any page class has not yet been compared. If yes, the processing proceeds to step S16. If comparisons with all the page classes have been completed, the processing proceeds to step S14.

Step S14: If it is determined in step S13 that comparisons with all the page classes have been completed, acquired HTTP data does not belong to any existing page class. Then, the page class creation block 135 creates a new page class in the page-class holding block 131 and stores the page information in the new page class.

Step S15: The page class creation block 135 creates an assignment determination condition under the assignment-determination-condition creation rule defined by the assignment-determination-condition creation rule definition block 136 and specifies the assignment determination condition to the page class created in step S14. Then, the processing ends.

Step S16: If it is determined in step S13 that any page class has not yet been compared, the page information classification block 134 selects a next page class, which has the highest priority level among the page classes waiting to be compared.

Step S17: The page information classification block 134 performs assignment determination processing, which will be described later in detail.

Step S18: The page information classification block 134 checks the result of the assignment determination processing performed in step S17, that is, whether the page information belongs to the page class selected in step S16. If yes, the processing proceeds to step S19. If no, the processing proceeds to step S13, and a comparison is made with a next page class.

Step S19: The page information classification block 134 puts the page information into the page class selected in step S16. To be more specific, the page information classification block 134 stores the page information in the selected page class. Then, the processing ends.

Now, the page information has been classified.

A method of creating an assignment determination condition will next be described in detail. The assignment determination condition is created under the assignment-determination-condition creation rule defined in the assignment-determination-condition creation rule definition block 136.

The assignment determination condition uses the URL and the parameter included in the request and the URL and the parameter of the link information included in the HTTP data. Now, the data structure of the URL and the parameter will be described.

Figure 10:
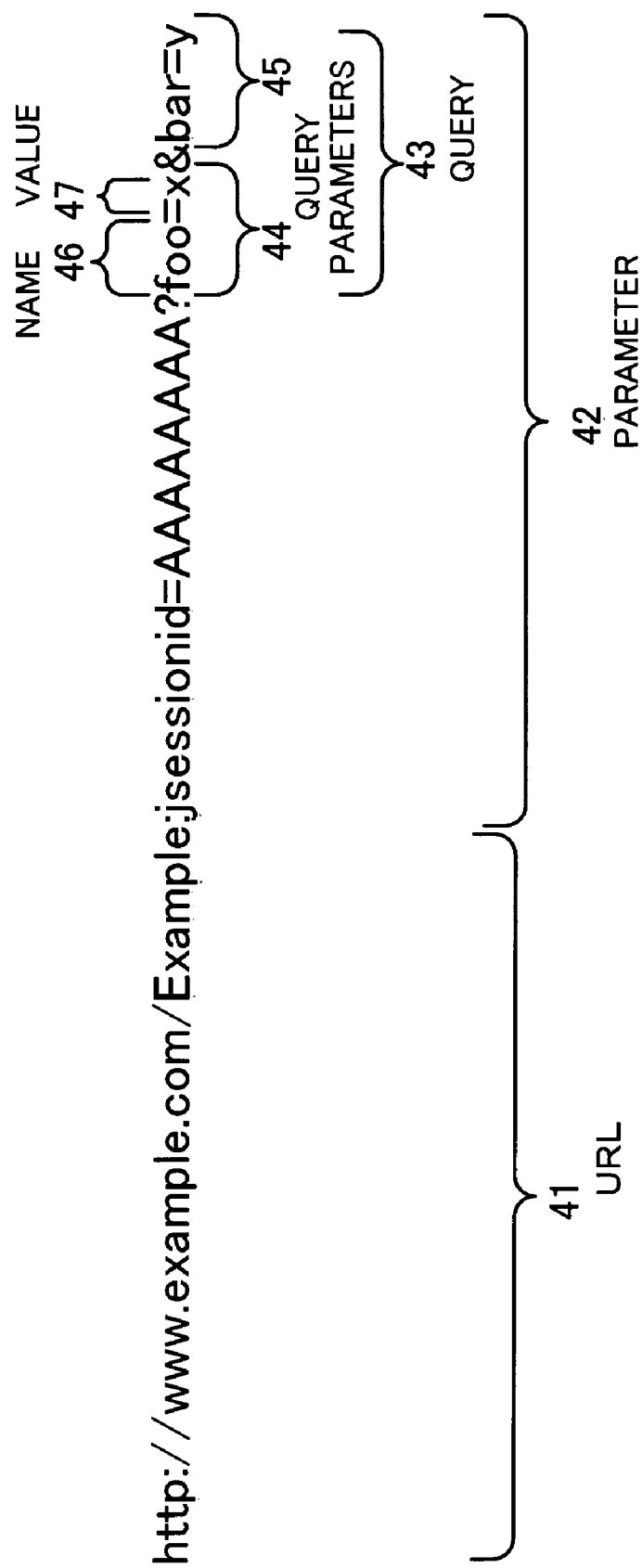
FIG. 10 shows a data structure of a URL and a parameter.

FIG. 10 shows a data structure of a URL and a parameter. A parameter 42 can be added to a URL 41, which specifies the location of the HTTP data. When the HTTP data specified by the URL 41 is acquired, the parameter 42 is passed to the web server holding the HTTP data. If the URL 41 specifies a web application, a query 43 can be specified after the question mark. The query 43 includes one or more query parameters 44 and 45. One query parameter 44 includes a name 46 and a value 47.

A URL and a parameter are included in this format in a request or HTTP data. An assignment determination condition can be created by analyzing the URL and the parameter associated with the target HTTP data.

An assignment determination condition is created under an assignment-determination-condition creation rule. The assignment-determination-condition creation rule can be defined by specifying items of acquired HTTP data in the corresponding fields of a template of the assignment determination condition, for instance.

FIG. 11 shows a displayed sample of an assignment-determination-condition creation rule 30. The template is broadly divided into these areas: three assignment determination fields 31 to 33, a query-parameter name field 34, an OK button 35, and a cancel button 36. An assignment determination condition is created by specifying items extracted from the page information in the corresponding fields.

The assignment determination field 31 defines a criterion for determining assignment in consideration of request conformity. The assignment determination field 31 has a checkbox in the top left corner. If a checkmark is placed in the checkbox, the assignment determination criterion specified in the assignment determination field 31 is applied.

The assignment determination field 31 has a URL field 31*a* and a query judgment criterion field 31*b*. In the URL field 31*a*, the URL of the HTTP data to be included in the page class is specified. The contents of a query to be included in a request for acquiring the HTTP data included in the page class are specified in the query judgment criterion field 31*b*.

The query judgment criterion field 31*b* has a checkbox in the top left corner. If a checkmark is placed in the checkbox, the criterion defined in the query judgment criterion field 31*b* is applied.

The query judgment criterion field 31*b* has a query field 31*ba* and target option fields 31*bb*, 31*bc*, and 31*bd*. A query parameter to be included in a request is specified in the query field 31*ba*. A query parameter specified in the query field 31*ba* is applied as an assignment determination condition, as specified by selecting one of the target options 31*bb*, 31*bc*, and 31*bd*.

The target option fields 31*bb*, 31*bc*, and 31*bd* specify the information to be used as assignment determination conditions, among query parameters specified in the query field 31*ba*. The target option fields 31*bb*, 31*bc*, and 31*bd* have respective selection buttons. If a selection button is selected, the corresponding query parameter is applied as an assignment determination condition.

If the target option field 31*bb* is selected, a set of query parameters (name and value) is checked. If the target option field 31*bc* is selected, a set of query parameter names is checked. If the target option field 31*bd* is selected, a set of given query parameters (name and value) and a set of other query parameter names are checked. When the target option field 31*bd* is selected, a set of query parameters (name and value) is checked with regard to a query parameter of which name is specified in the query parameter name field 34.

The assignment determination field 32 defines a criterion for determining assignment in consideration of response status code. The assignment determination field 32 has a checkbox in the top left corner. If a checkmark is placed in the checkbox, the assignment determination criterion defined in the assignment determination field 32 is applied.

The assignment determination field 32 has a response status code field 32*a* where a response status code acquired with the HTTP data belonging to the page class is specified.

The assignment determination field 33 defines a criterion for determining assignment in consideration of link information included in the response. The assignment determination field 33 has a checkbox in the top left corner. If a checkmark is placed in the checkbox, the assignment determination criterion defined in the assignment determination field 33 is applied.

The assignment determination field 33 has a URL field 33*a* of the link information, a query field 33*b* of the link information, a query-conformity judgment field 33*c*, and a set-conformity judgment field 33*d*.

A URL to be included in the HTTP data is specified in the URL field 33*a*. A query to be assigned to the URL specified in the URL field 33*a* is specified in the query field 33*b*.

The query-conformity judgment field 33*c* specifies whether any information in a query is checked in terms of conformity. The query-conformity judgment field 33*c* has target option fields 33*ca*, 33*cb*, and 33*cc*.

The target option field 33*ca*, 33*cb*, or 33*cc* is selected to specify which query parameter specified in the query-conformity judgment field 33*c* is used as an assignment determination requirement. The target option fields 33*ca*, 33*cb*, and 33*cc* have respective selection buttons. When a selection button is selected, the query parameter specified in the corresponding target option field is applied as an assignment determination requirement.

If the target option field 33*ca* is selected, a set of query parameters (name and value) is checked. If the target option field 33*cb* is selected, a set of query parameter names is checked. If the target option field 33*cc* is selected, a set of given query parameters (name and value) and a set of other query parameter names are checked. When the target option field 33*cc* is selected, a set of query parameters (name and value) is checked with regard to a query parameter having the name specified in the query parameter name field 34.

The set-conformity judgment field 33*d* specifies whether the conformity of a set is checked. If the conformity of a set is checked, identical pieces of link information found in the HTTP data are assumed to be a set of link information, and the attribute is checked. The link information is handled as a single set of information if the information to be checked in an attribute check is the same.

The query parameter name field 34 specifies the name of a query parameter the name and the value of which are checked when the query parameter is used as the target of judgment.

The OK button 35 is clicked on to determine any modification made to the items included in the template. The cancel button 36 is clicked on to end editing without incorporating any modification made to the items included in the template.

With the items specified above, the assignment-determination-condition creation rule 30 is defined by the assignment-determination-condition creation rule definition block 136. The default condition of the assignment-determination-condition creation rule 30 is specified by the assignment-determination-condition creation rule definition block 136 as designated by the user. The default condition includes whether the checkboxes of the assignment determination fields 31, 32, 33, and so on are selected. If a checkmark is placed in the checkbox of the query judgment criterion field 31b by default, one of the target option fields 31bb, 31bc, and 31bd is selected by default. If a checkmark is placed in the checkbox of the query-conformity judgment field 33c by default, one of the target option fields 33ca, 33cb, and 33cc is selected by default. A default parameter name can also be specified in the query-parameter name field 34.

The page class creation block 135 creates an assignment determination condition for HTTP data, based on the assignment-determination-condition creation rule 30. In the meantime, the page class creation block 135 receives from the page acquisition block 120 the contents of a request for acquiring HTTP data from the web server.

Figure 12:
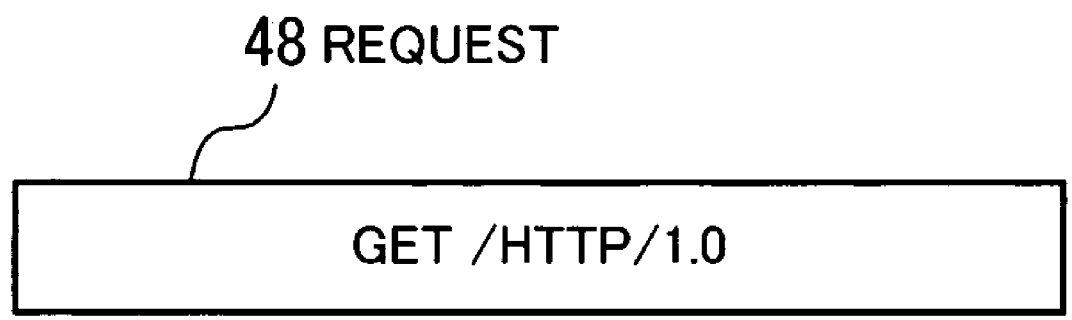
FIG. 12 shows a sample request.

FIG. 12 shows a sample request 48, of which contents are "GET /HTTP/1.0". When the request 48 is sent on the network 10, the web server gives a response.

In this embodiment, the URL and the query in the request 48 can be extracted as described below.

The page information classification block 134 and the page class creation block 135 can extract the following information by parsing (analyzing the data structure of) the request 48 and the data used to connect the web server.

If the connection is not made through a proxy server, for instance, the page information classification block 134 and the page class creation block 135 can extract a host name and a port number from the data used for the connection. The page information classification block 134 and the page class creation block 135 can detect a host name and a port number also from the request line (the first line) of the request 48. If the request has a Host header field, the page information classification block 134 and the page class creation block 135 can extract a host name and a port number also from the header.

FIG. 13 shows a sample response 49 containing the HTTP data of an HTTP page.

A response status code can be extracted as described below. The page information classification block 134 and the page class creation block 135 parse the response 49 to extract a status code. A status line is the first line of the response 49.

Link information can be extracted from a response. The page information classification block 134 and the page class creation block 135 parse the response 49 to extract link information. To be more specific, if the status code is 3XX, the page information classification block 134 and the page class creation block 135 extract link information from a location header field and the like. The page information classification block 134 and the page class creation block 135 parse an entity body. If the response 49 includes HTML data, the page information classification block 134 and the page class creation block 135 extract link information from a href attribute value, a result of parsing of a form indicated by a form tag, a refresh destination indicated by a meta tag, and the like.

When the request 48 shown in FIG. 12 and the response 49 shown in FIG. 13 are given, the page class creation block 135 extracts information corresponding to the fields of the assignment-determination-condition creation rule 30 from the response 48 and the response 49 and specifies the extracted information in the corresponding fields. Now, an assignment determination condition is created.

FIG. 14 shows a sample assignment determination condition 30a. The assignment determination condition 30a has the same data structure as the assignment-determination-condition creation rule 30. Items extracted from the request 48 and the response 49 are specified in the corresponding fields.

In the shown sample, "http://www.sample.com" is specified in the URL field 31a; "200" is specified in the response status code field 32a; and "http://www.sample.com/foo.cgi" and "http://www.sample.com/bar.cgi" are specified twice each in the URL field 33a. In the query field 33b, "date=1" and "date=2" are specified in association with "http://www.sample.com.foo.cgi" in the URL field 33a, and "action=view" and "action=edit" are specified in association with "http://sample.com/bar.cgi" in the URL field 33a.

The assignment determination condition 30a created with the items as described above is specified in a new page class, together with the HTTP data included in the response 49. A given default priority level is assigned to the assignment determination condition 30a.

Assignment determination processing performed by the page information classification block 134 will next be described.

Figure 15:
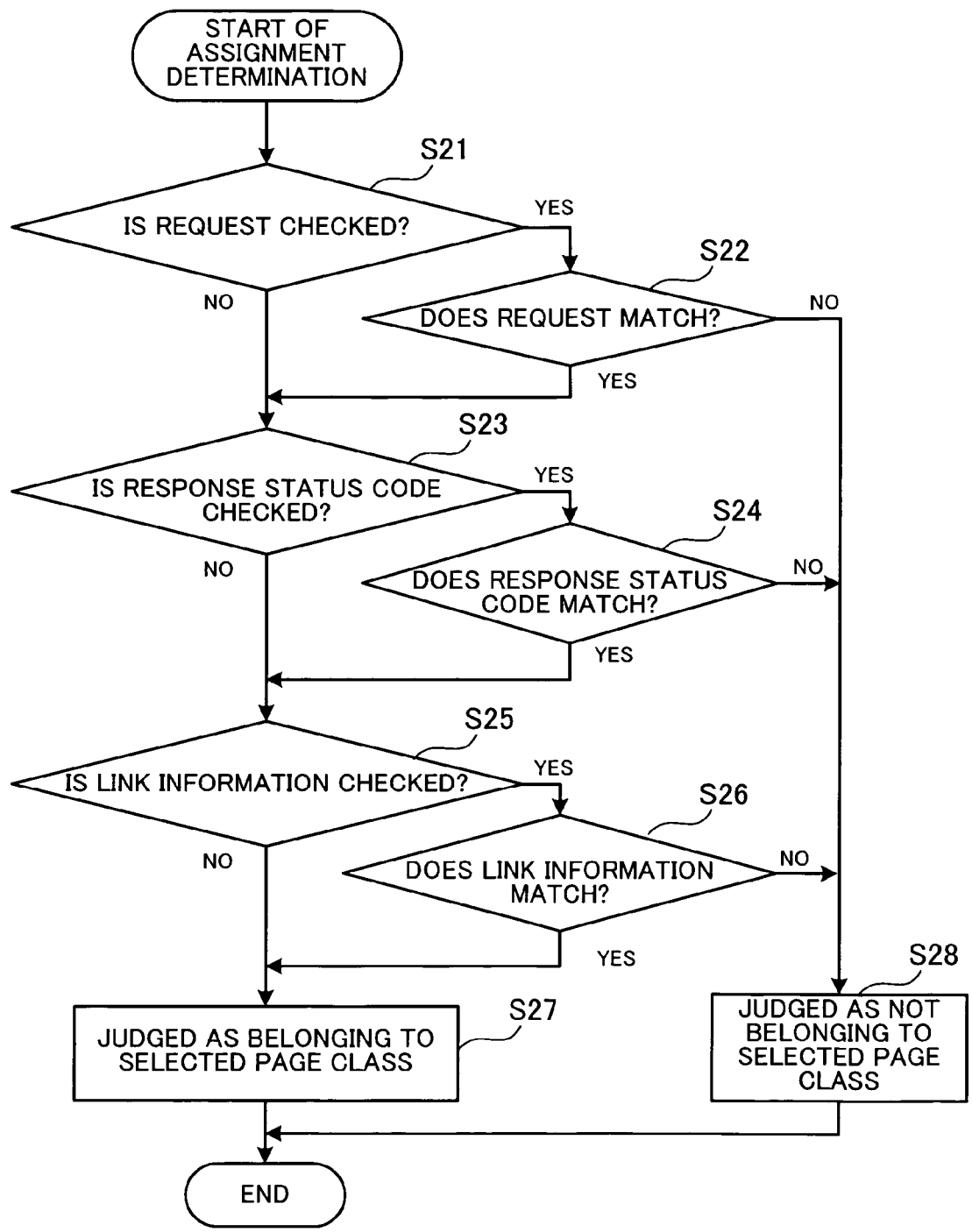
FIG. 15 is a flow chart showing the steps of assignment determination processing.

FIG. 15 is a flow chart showing the steps of the assignment determination processing. The steps of the processing will be explained in order of step numbers.

Step S21: The page information classification block 134 references the assignment determination condition of a selected page class and determines whether the URL and the query of the request should be checked. This determination can be made by seeing whether a checkmark is placed in the checkbox of the assignment determination field 31. If the request should be checked, the processing proceeds to step S22. If the request need not be checked, the processing proceeds to step S23.

Step S22: The page information classification block 134 checks whether the URL of the request matches the URL specified in the URL field 31a of the assignment determination condition 30a. If the conformity of the query must also be checked, the page information classification block 134 checks whether the query parameter of the request matches the query parameter specified in the query field 31ba. If all the target items match, the processing proceeds to step S23. If any target item does not match, the processing proceeds to step S28.

Step S23: The page information classification block 134 determines whether the response status code should be checked. This determination can be made by seeing whether a checkmark is placed in the checkbox of the assignment determination field 32. If the response status code should be checked, the processing proceeds to step S24. If the response status code need not be checked, the processing proceeds to step S25.

Step S24: The page information classification block 134 checks whether the response status code of the response matches the response status code specified in the response status code field 32*a*. If yes, the processing proceeds to step S25. If no, the processing proceeds to step S28.

Step S25: The page information classification block 134 determines whether link information should be checked. This determination can be made by seeing whether a checkmark is placed in the checkbox of the assignment determination field 33. If the link information should be checked, the processing proceeds to step S26. If the link information need not be checked, the processing proceeds to step S27.

Step S26: The page information classification block 134 checks whether the link information included in the HTTP data matches the URL specified in the URL field 33*a* and the query parameter specified in the query field 33*b*. The query parameter defined as the target is compared.

If the assignment determination condition 30*a* is specified as shown in FIG. 14, just the query parameter name is compared, with regard to "http://www.sample.com/foo.cgi". As for "http://www.sample.com/bar.cgi", both the query parameter name and the query parameter value are compared because "action" is specified in the query parameter name field 34.

If the link information matches, the processing proceeds to step S27. If the link information does not match, the processing proceeds to step S28.

Step S27: The page information classification block 134 determines that the acquired page information belongs to the selected page class. Then, the processing ends.

Step S28: If any item does not match, the page information classification block 134 determines that the page information does not belong to the selected page class. Then, the processing ends.

Page information can be classified into page classes, based on the conformity between the current page information and page information acquired earlier. When a new page class is created, page information indicated by the link information included in the HTTP data stored in the page class is collected.

The functions of the page acquisition block 120 will next be described in detail.

Figure 16:
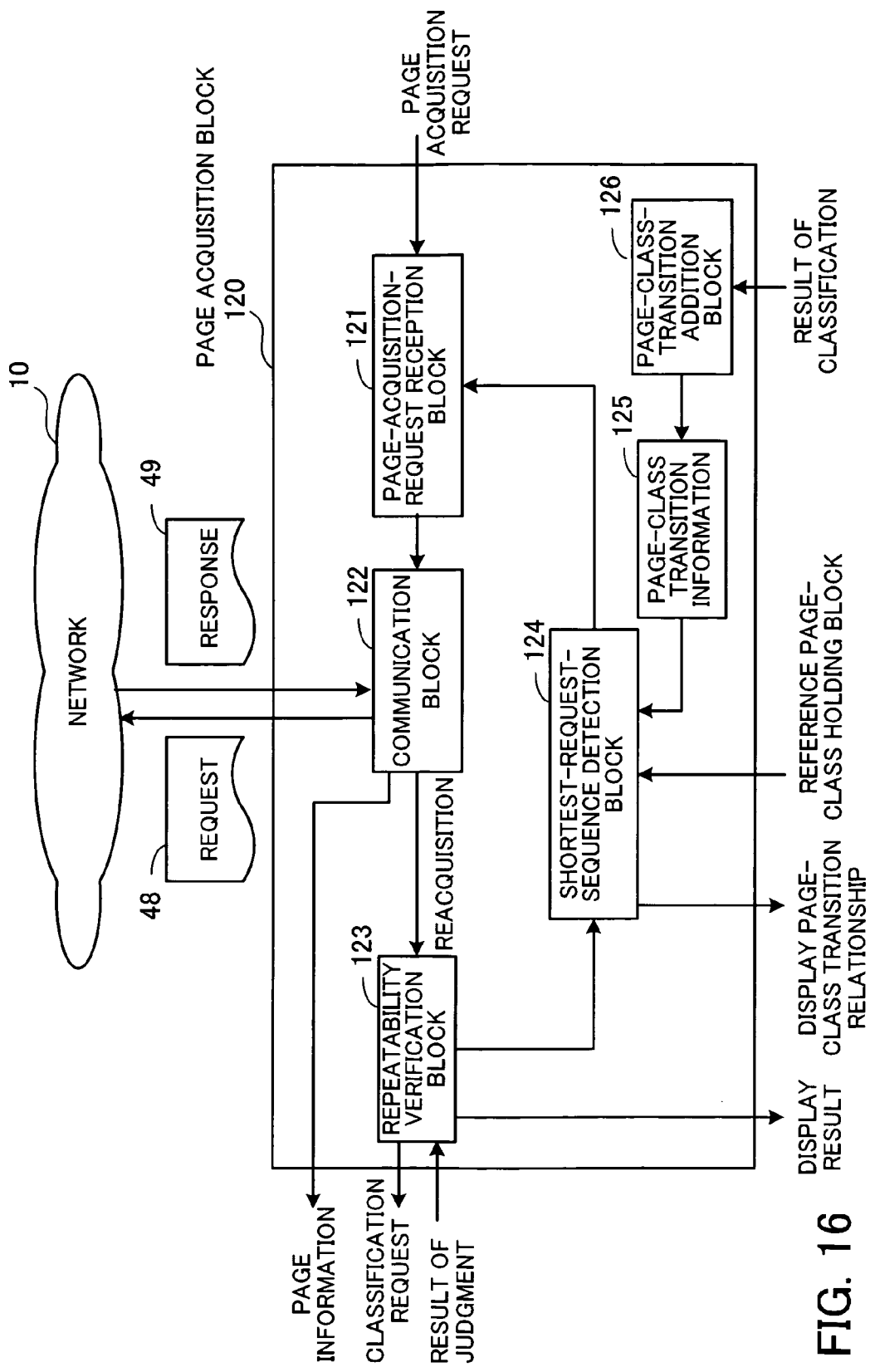
FIG. 16 is a block diagram representing the functions of a page acquisition block.

FIG. 16 is a block diagram representing the functions of the page acquisition block 120. The page acquisition block 120 includes a page-acquisition-request reception block 121, a communication block 122, a repeatability verification block 123, a shortest-request-sequence detection block 124, page-class transition information 125, and a page-class-transition addition block 126.

The page-acquisition-request reception block 121 receives a page acquisition request. A page acquisition request may be a request for acquiring a page indicated by the link information extracted from the HTTP data or may be a request for reacquiring a page acquired earlier. If a page reacquisition request is given, the page-acquisition-request reception block 121 creates a request sequence for reacquisition. The request sequence for reacquiring a page which was acquired earlier specifies a path of links to be followed to reach the target page. The page-acquisition-request reception block 121 passes a single page request or a request sequence to the communication block 122.

The communication block 122 sends a request 48 to the web server based on the request or the request sequence received from the page-acquisition-request reception block 121 and receives a response 49 to the request 48. When an ordinary page acquisition request (not a page reacquisition request) has been made, the communication block 122 passes a combination of the request 48 and the response 49 to the page conformity judgment block 130. When a page reacquisition request is made, the communication block 122 passes a combination of the request 48 for the page acquired last in the request sequence and the response 49 to the repeatability verification block 123.

The repeatability verification block 123 passes the request 48 and the response 49 and outputs a classification request to the page conformity judgment block 130. The page conformity judgment block 130 judges the conformity of the HTTP data acquired earlier in response to the classification request and returns the result. If nonconformity is returned, the repeatability verification block 123 notifies the shortest-request-sequence detection block 124 of the result. The repeatability verification block 123 displays the result on the monitor screen.

The shortest-request-sequence detection block 124 detects the shortest request sequence required to acquire the specified page, in response to a shortest-request-sequence detection request. To be more specific, the shortest-request-sequence detection block 124 references the page-class transition information 125, detects a path of links to be followed to acquire the target page from the top page, and creates a request sequence along the detected path. The shortest-request-sequence detection block 124 then passes the request sequence to the page-acquisition-request reception block 121 and makes a request for reacquiring the page.

The repeatability verification block 123 then judges page repeatability based on the request sequence detected by the shortest-request-sequence detection block 124. If the current page is put into the same page class as the page acquired earlier, it is judged that the page reacquisition by the request sequence has succeeded. The shortest-request-sequence detection block 124 detects the shortest path (the specified page can be reached by acquiring the smallest number of pages) among the request sequences of successful page reacquisition.

The page-class transition information 125 represents links between the information of pages belonging to different page classes.

The page-class-transition addition block 126 updates the page-class transition information 125 in accordance with the page information classified by the page conformity judgment block 130.

Figure 17:
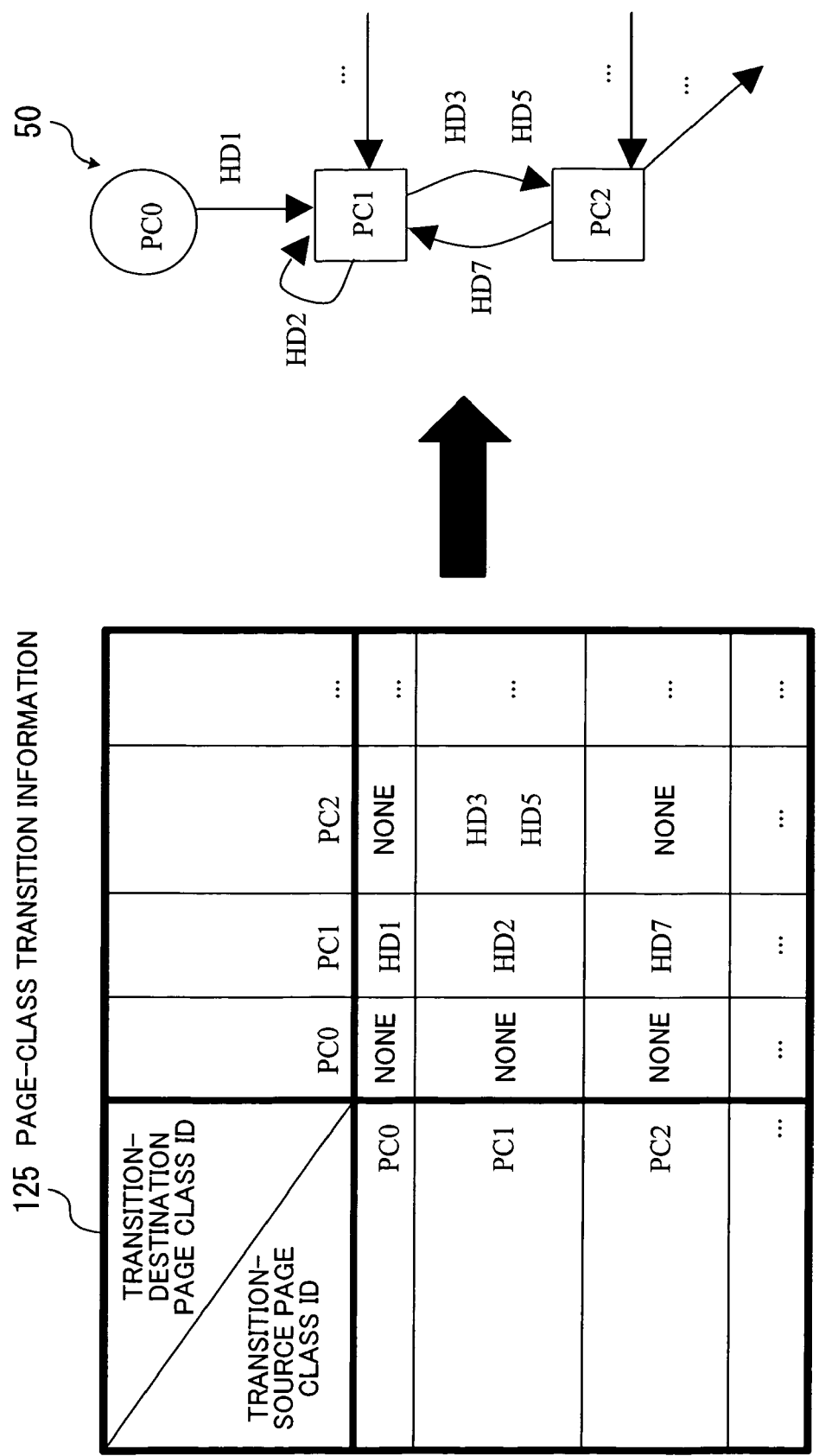
FIG. 17 shows a sample data structure of page-class transition information.

FIG. 17 shows a sample data structure of page-class transition information. The page-class transition information 125 includes a combination of a transition-destination page class ID and a transition-source page class ID, associated with a link information ID representing a transition between the page classes.

The shortest-request-sequence detection block 124 recognizes a page-class transition relationship 50 based on the page-class transition information 125. In the page-class transition relationship 50, page classes are represented by nodes, and page-class transitions are represented by arrows.

The processing to update the page-class transition information 125 will next be described.

The page information classification block 134 puts new page information HDx (x is an integer not smaller than 1) into a new page class PCy (y is an integer not smaller than 1). To be more specific, the page information classification block 134 adds an HDx line to the page information group 133 shown in FIG. 8.

The page information classification block 134 adds a PCy line to the page-class holding block 131, shown in FIG. 7. At the same time, a new assignment priority level and a new assignment determination condition created by the page class creation block 135 are added to the corresponding fields. When a new line is added to the page-class holding block 131, a new page class is created. If PCy has already been present, the processing to create a new page class is omitted.

The page information classification block 134 also adds HDx to the column of the set of IDs of assigned HTTP data and the column of the ID used to reacquire HTTP data, in the row of PCy. If PCy has already been present, the processing to write the ID used to reacquire HTTP data is omitted.

The page-class-transition addition block 126 checks updates in the page-class holding block 131 and adds a PCy row and a PCy column to the page-class transition information 125. If PCy has already been present, the processing to add the row and the column is omitted.

The page-class-transition addition block 126 also adds information to the page-class transition information 125. To be more specific, the page-class-transition addition block 126 adds HDx to the box in the row where PCs (s is zero or a greater integer), which is an ID of the page class from which a request for page information added to the page-class holding block 131 is made, is specified as a transition-source page class ID and in the column where PCy is specified as a transition-destination page class ID.

If the ID of the page class from which a request for HTTP data is made is not known, PC0 indicating the page information acquired first is specified as PCs, for instance. PCs can also be inferred from the Referrer header field of the HTTP data request.

The shortest-request-sequence detection block 124 creates a page-class transition relationship 50 based on the page-class transition information 125, following this procedure: The shortest-request-sequence detection block 124 provides a black node as PC0 or a base point for reacquiring page information; the shortest-request-sequence detection block 124 next provides a square node as PCi (i is an integer not smaller than 1) or a page class ID included in the page-class holding block 131 shown in FIG. 7; and the shortest-request-sequence detection block 124 further provides a directional arrow between nodes where transition information is provided in the page-class transition information 125.

When the path information of node PCy is output, the shortest-request-sequence detection block 124 further acquires HDx, which is an ID of page information used for reacquiring PCy, from the page-class holding block 131. The shortest-request-sequence detection block 124 next checks the column of PCy in the page-class transition information 125 and obtains PCs in a row where HDx is included. The shortest-request-sequence detection block 124 then outputs an arrow of PCs to PCy as path information.

If PCs is not PC0, or the page class of a base page, the shortest-request-sequence detection block 124 assumes PCs to be a new PCy and repeats the processing from obtaining an ID of page information used for reacquisition from the page-class holding block 131. The reacquisition path information can be obtained by following the page information used for reacquisition toward the base page.

Figure 18:
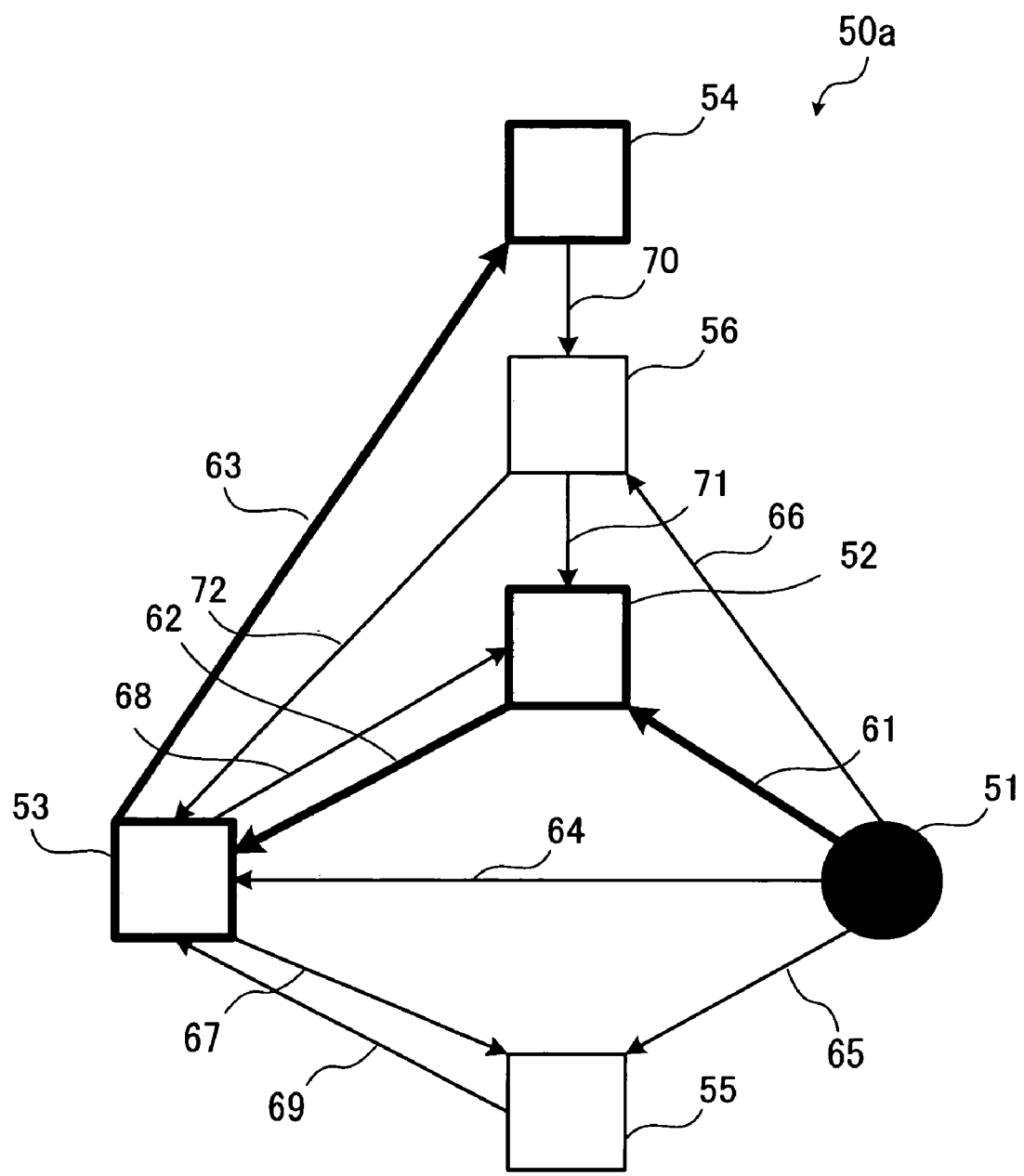
FIG. 18 shows a sample page-class transition relationship.

FIG. 18 shows a sample page-class transition relationship 50*a*. The page-class transition relationship 50*a* has a plurality of nodes 51 to 56 and a plurality of edges 61 to 72. The nodes 51 to 56 correspond to page classes, and the edges 61 to 72 correspond to page-class transitions. A transition relationship generally represents transitions that can be made by following link information of the page classes.

In FIG. 18, the node 51 represents a page class from which page information is reacquired. The edges 61, 64, 65, and 66 outgoing from the node 51 represent transitions where page information can be directly acquired by a bookmark function (function to display a page of a URL specified beforehand) of a web browser, for instance.

Edges and nodes included in the path information created from the page information for reacquisition are highlighted (shown by thick lines in FIG. 18). When a page corresponding to the node 54 is reacquired, the pages corresponding to the nodes 51, 52, 53, and 54 are acquired in that order. This sequence of page acquisition is a request sequence.

If a request for detecting the shortest request sequence is made, the shortest-request-sequence detection block 124 detects the shortest request sequence.

Figure 19:
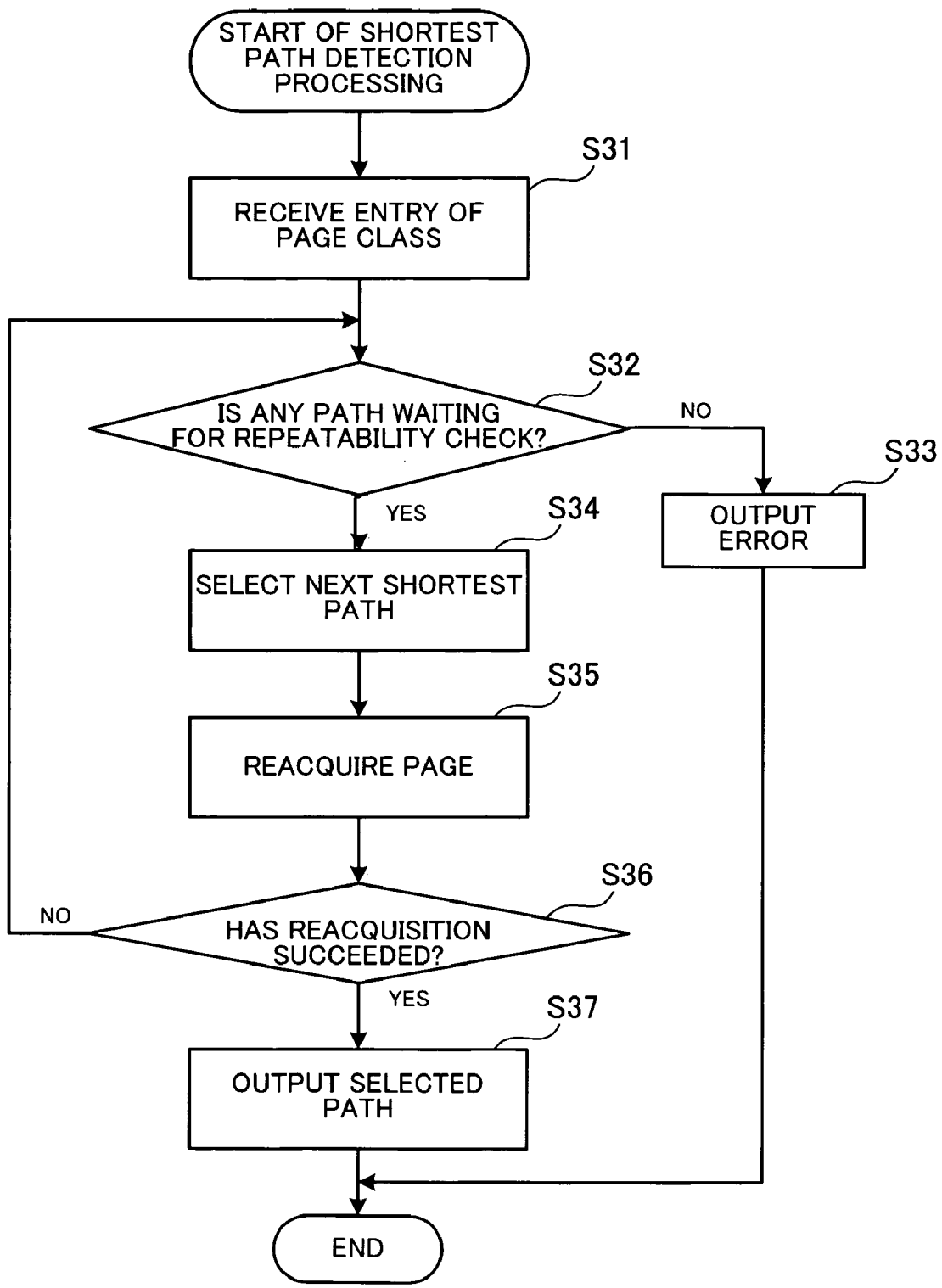
FIG. 19 is a flow chart showing the steps of processing to detect the shortest request sequence.

FIG. 19 is a flow chart showing the steps of the processing to detect the shortest request sequence. The steps of the processing will be explained in order of step numbers.

Step S31: The shortest-request-sequence detection block 124 receives an entry of a page class to be reached by the shortest request sequence.

Step S32: The shortest-request-sequence detection block 124 determines whether any path from the base page class to the specified page class is waiting for a repeatability check. If there is any path waiting for a repeatability check, the processing proceeds to step S34. If there is no such path, the processing proceeds to step S33.

Step S33: The shortest-request-sequence detection block 124 outputs an error message indicating that the specified page class cannot be reacquired in the current state of the web site. The error message provides the contents of the request (request sequence), the contents of the response, the page class to include the page information, and others. Then, the processing ends.

Step S34: The shortest-request-sequence detection block 124 selects the shortest path of the unverified paths as a target of the repeatability check. The shortest path is a path including the smallest number of page transitions based on the link information.

Step S35: The shortest-request-sequence detection block 124 attempts to reacquire the page in the selected path. To be more specific, the shortest-request-sequence detection block 124 creates a request sequence based on the selected path and outputs a request for reacquiring page information to the page-acquisition-request reception block 121 in accordance with the request sequence. The page-acquisition-request reception block 121 then creates a request for page information on the path. The communication block 122 obtains a response to the request.

The page information last acquired in the request sequence, including the request, the response, and others, is passed to the repeatability verification block 123. The repeatability verification block 123 checks the repeatability and passes the result of the repeatability check to the shortest-request-sequence detection block 124.

Step S36: The shortest-request-sequence detection block 124 determines whether the page was successfully reacquired, in accordance with the result of the repeatability check. When the page conformity judgment block 130 determines that the reacquired page information belongs to the page class specified in step S31, the reacquisition is judged to be successful. If the page is successfully reacquired, the processing proceeds to step S37. If the page cannot be successfully reacquired, the processing proceeds to step S32.

Step S37: The shortest-request-sequence detection block 124 displays a page-class transition relationship, highlighting the path selected in step S34 as a reacquisition path.

The shortest-request-sequence detection block 124 also updates the ID of the page information used for reacquisition, stored in the page-class holding block 131, in accordance with the reacquisition path. To be more specific, the shortest-request-sequence detection block 124 references the page-class transition information 125 and acquires the ID of page information including link information from the transition-source page class to the transition-destination page class directly linked in the reacquisition path. The shortest-request-sequence detection block 124 adds to the page-class holding block 131 the page information ID as the ID of the page information used for reacquisition, of the transition-source page class.

The shortest path by which page information belonging to the specified page class can be reacquired is detected as described above. The shortest-request-sequence detection block 124 updates the page-class transition relationship based on the search result.

Figure 20:
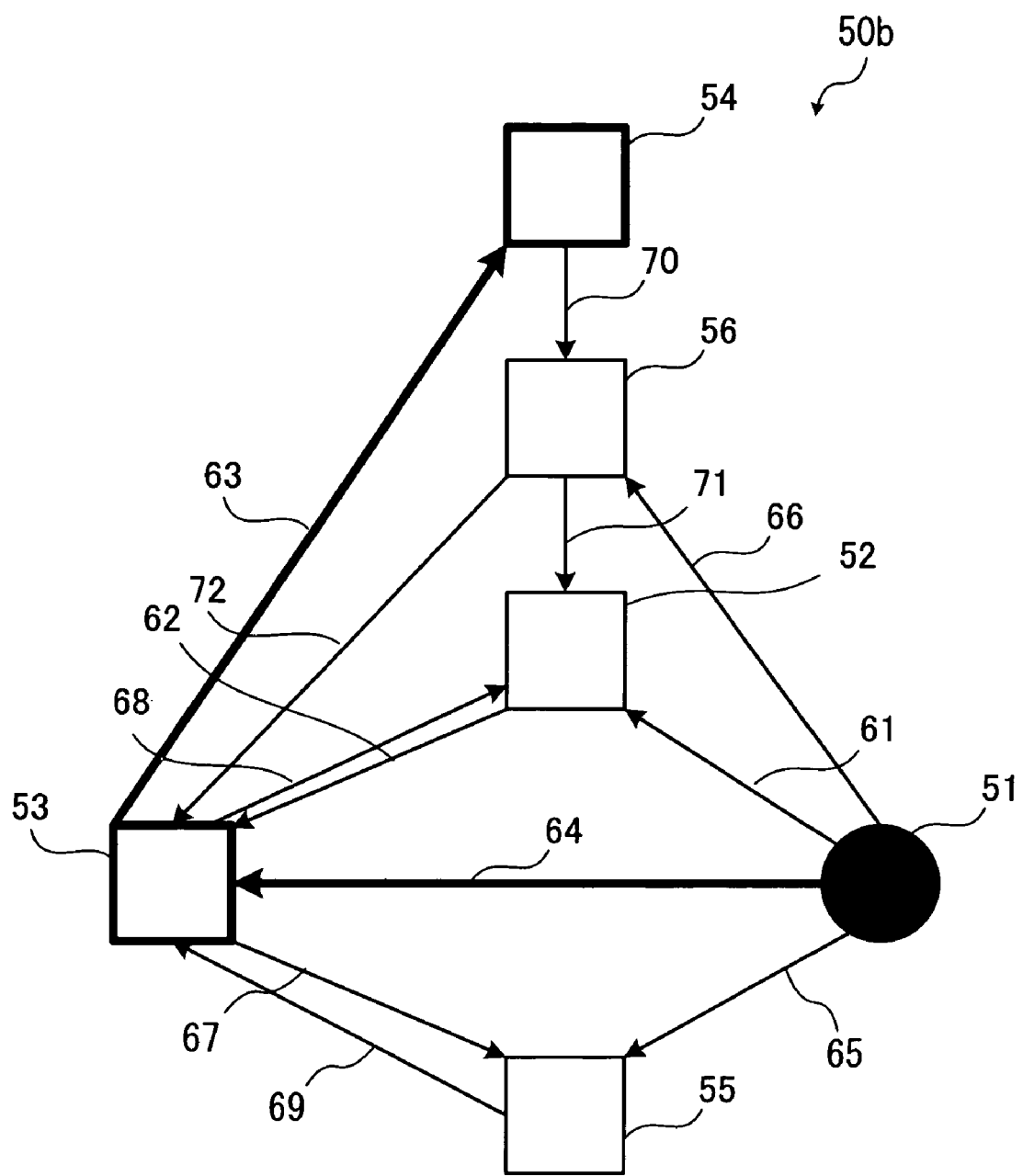
FIG. 20 shows an updated page-class transition relationship.

FIG. 20 shows an updated page-class transition relationship 50b. The page-class transition relationship 50b shows a result of the processing for detecting the shortest request sequence, where the page class corresponding to node 54 of the page-class transition relationship 50a shown in FIG. 19 is specified.

In the shown example, the path from the node 51 through the node 52 to the node 53 in the page-class transition relationship 50a is changed to a direct transition from the node 51 to the node 53 in the page-class transition relationship 50b. Whereas the page information of a page class corresponding to node 54 can be acquired in a request sequence including three requests in the page-class transition relationship 50a, the same page information can be obtained with two requests in the page-class transition relationship 50b. The number of transitions is decreased by one.

In many cases, the page repeatability cannot be obtained if the web server changes the contents of a response to a request, depending on whether data that can be added or deleted is present. Suppose that data forming the basis of judgment is present when page information is acquired for the first time. If the data is deleted later, the page can be repeated just by a request sequence including data reentry processing. A sample web application performing this type of processing will be described below.

Figure 21:
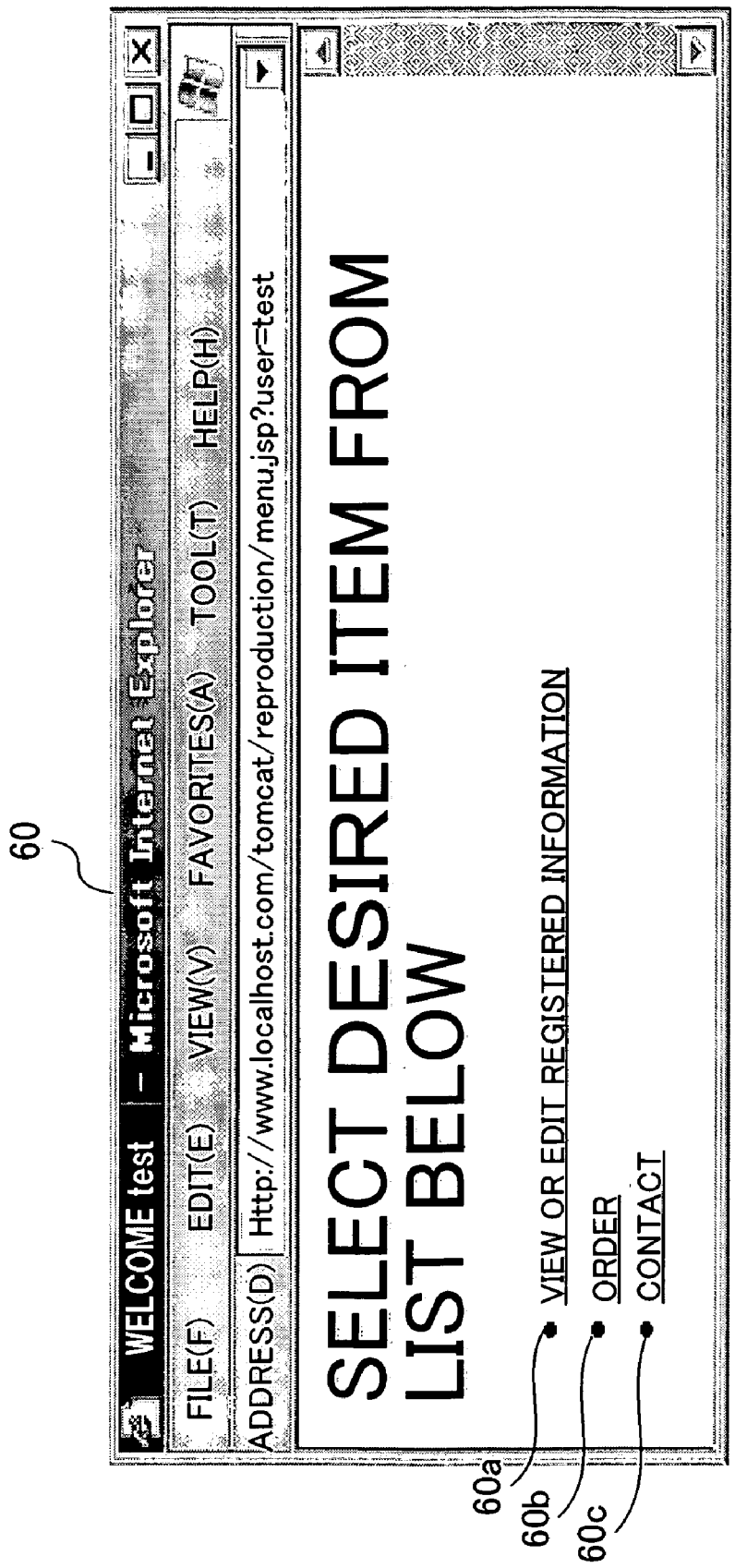
FIG. 21 shows a sample web application which allows data to be added and deleted.

FIG. 21 shows a sample web application which allows data to be added and deleted. FIG. 21 shows a menu screen 60 of the web application. The user who wants to receive information by mail can enter his or her mail address on the menu screen. The menu screen 60 has link indicators 60a to 60c associated with respective pieces of link information.

When the link indicator 60a of VIEW OR EDIT REGISTERED INFORMATION, the link indicator 60b of ORDER, or the link indicator 60c of CONTACT is selected, a request based on the associated link information is sent.

If linked HTTP data is acquired by selecting the link indicator 60a of VIEW OR EDIT REGISTERED INFORMATION, an e-mail address can be specified or deleted. If linked HTTP data is acquired by selecting the link indicator 70c of CONTACT, an inquiry can be sent on the web application. However, the answer is sent by e-mail, so that an e-mail address must be specified beforehand.

Figure 22:
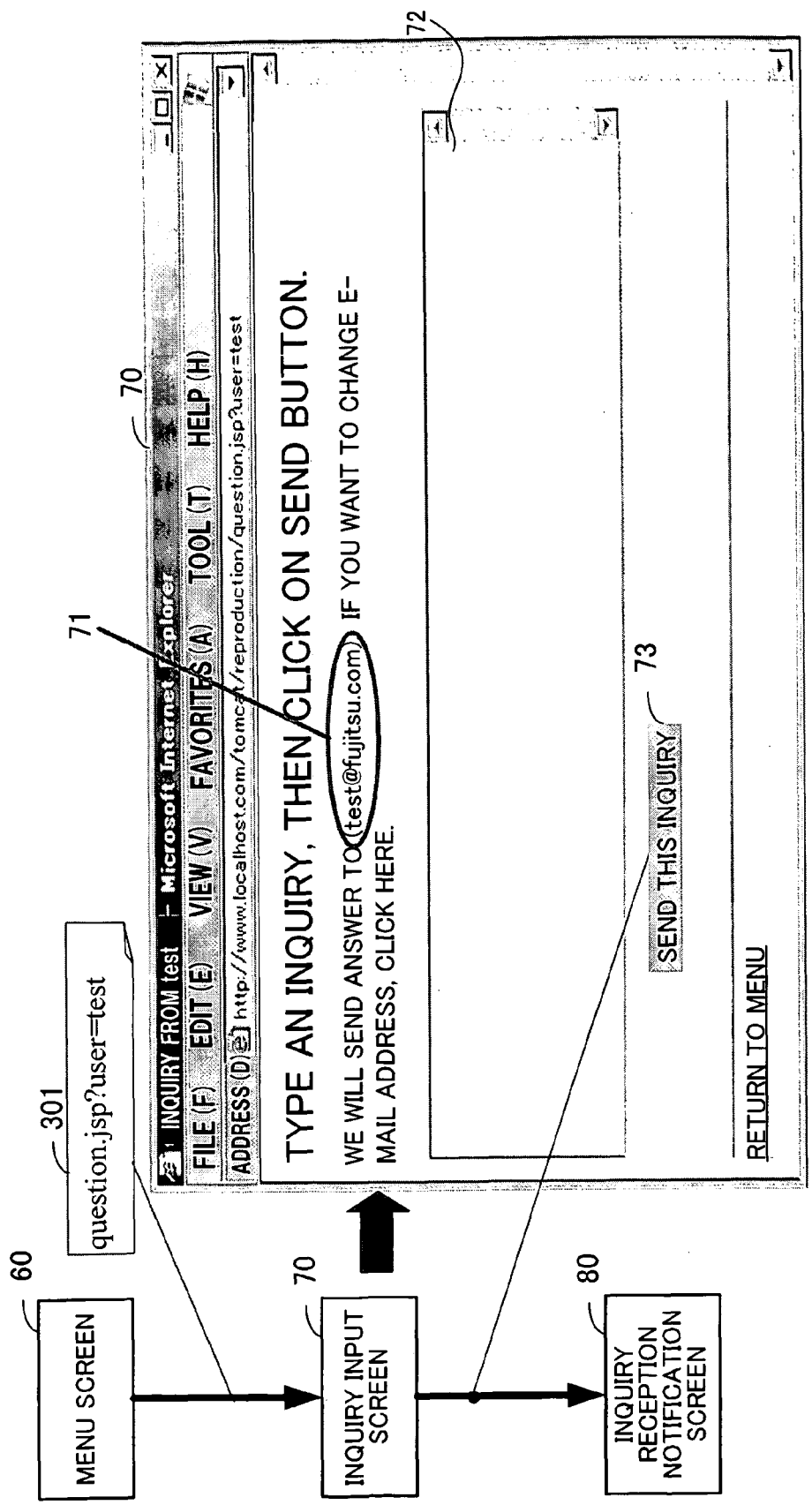
FIG. 22 shows an inquiry input screen.

FIG. 22 shows an inquiry input screen 70. When the link indicator 60c of CONTACT is selected, the inquiry input screen 70 is displayed. A parameter included in an associated request 301 is "question.jsp?user=test", for instance.

The inquiry input screen 70 has an e-mail address display field 71, an inquiry input field 72, and a send button 73. The e-mail address display field 71 shows the user's e-mail address specified beforehand. The inquiry input field 72 is a text box in which an inquiry to the web-site administrator can be typed. The send button 73 is clicked on to send the inquiry to the web server. When the send button 73 is clicked on, an inquiry reception notification screen 80 appears.

Figure 23:
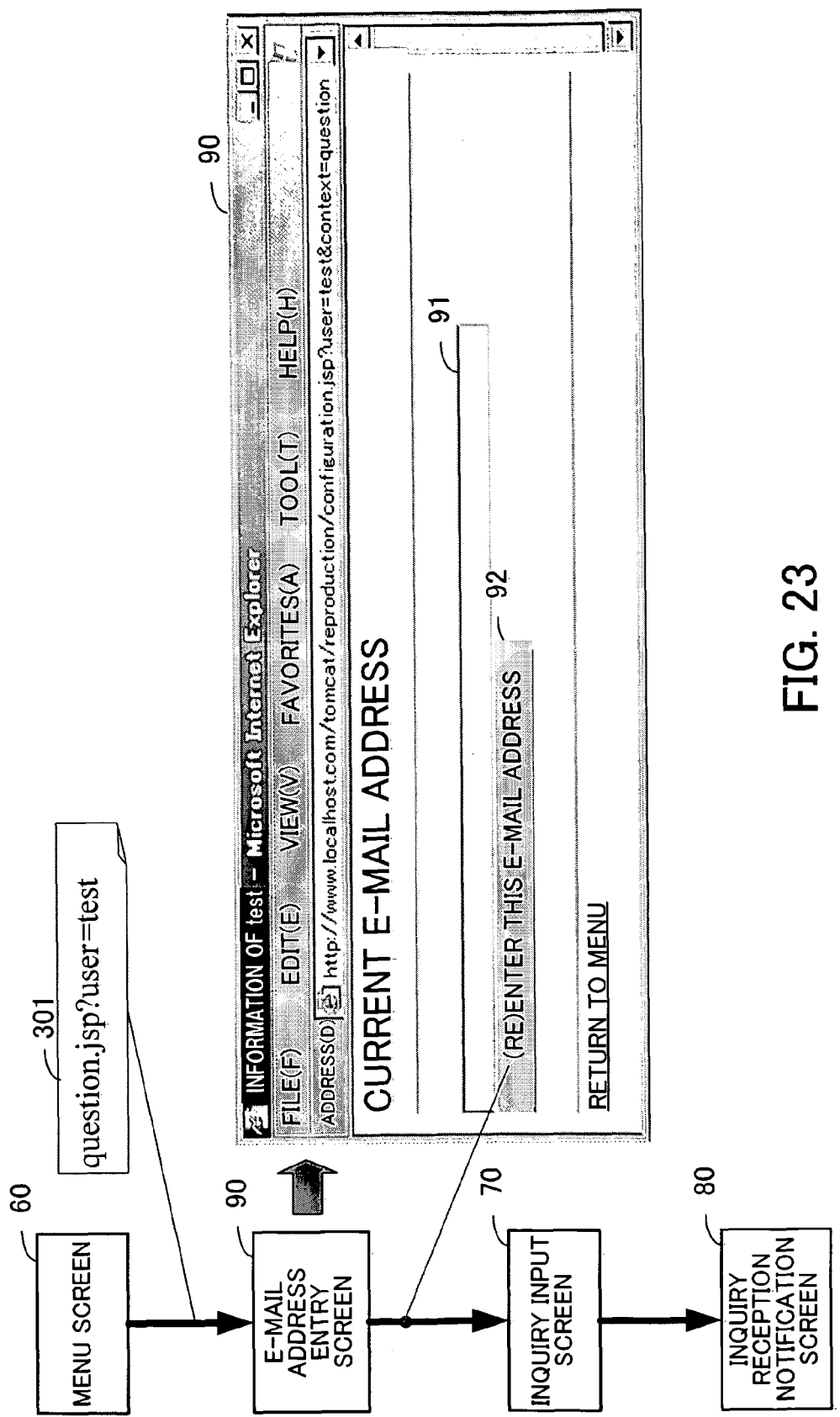
FIG. 23 shows an e-mail address entry screen.

If the link indicator 60c of CONTACT is selected while no e-mail address is specified, an e-mail address entry screen 90 appears as shown in FIG. 23.

The e-mail address entry screen 90 appears when the link indicator 60c of CONTACT is selected while no e-mail address is specified. Although a request identical to the request 301 on the inquiry input screen 70 is output, different HTTP data is returned as a response. This means that there is no repeatability.

The e-mail address entry screen 90 has an e-mail address input field 91 and an enter button 92. The e-mail address input field 91 is a text box where the user's e-mail address can be typed. The enter button 92 is clicked on to send the specified mail address to the web server and to get the address entered. When the enter button 92 is selected, the inquiry input screen 70 appears. The page information of the inquiry input screen 70 can be acquired by specifying an e-mail address.

Figure 24:
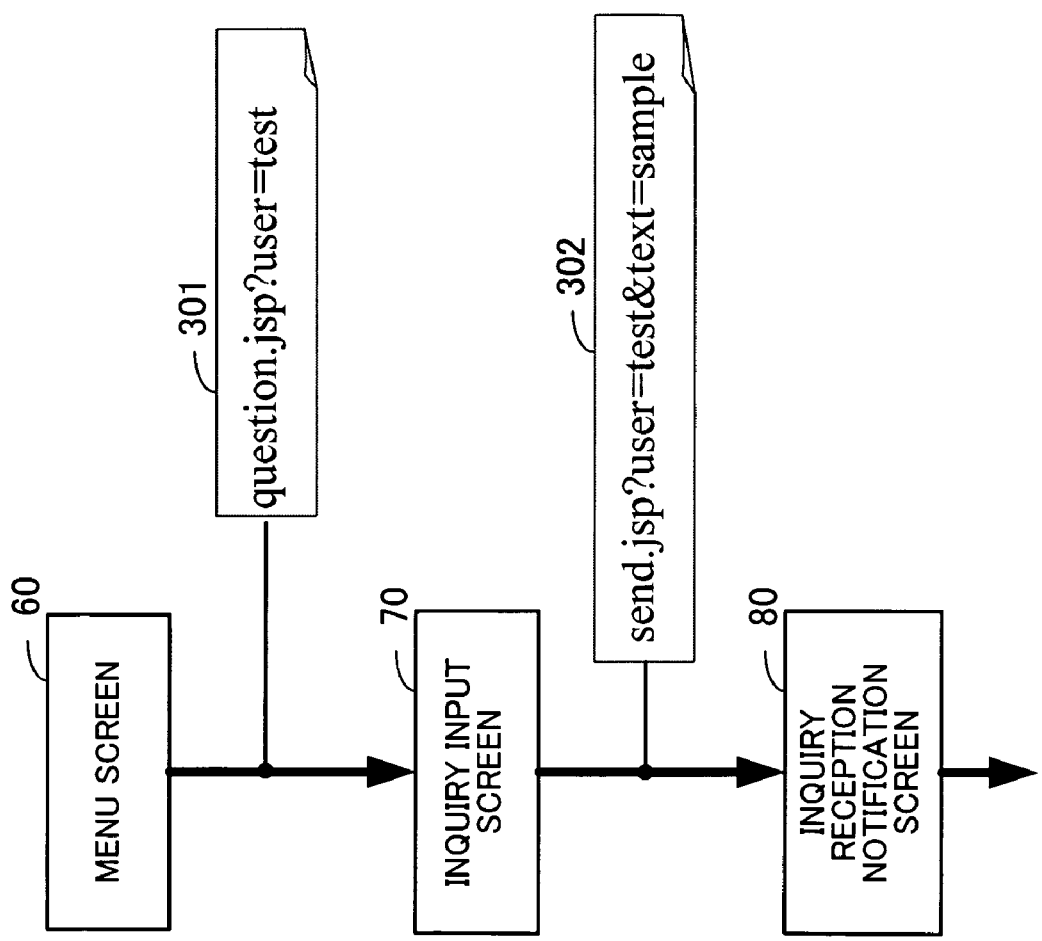
FIG. 24 shows a page information collection procedure.

If an e-mail address is specified beforehand, page information is collected from a web application having the page structure as described above, in a page information collection procedure as shown in FIG. 24.

As shown in FIG. 24, when the request 301 is sent from the menu screen 60 to the web server, the page information of the inquiry input screen 70 can be acquired. When the send button 73 to send an inquiry is selected, a request 302 corresponding to the send button 73 is sent to the web server, and the page information of the inquiry reception notification screen 80 can be acquired.

Now, a request sequence to send the request 302 after the request 301 is obtained. This request sequence is stored in the page-class transition information 125.

Suppose that the e-mail address is deleted after a test entry on another page. If page information is acquired by the request sequence shown in FIG. 24, different page information would be returned.

Figure 25:
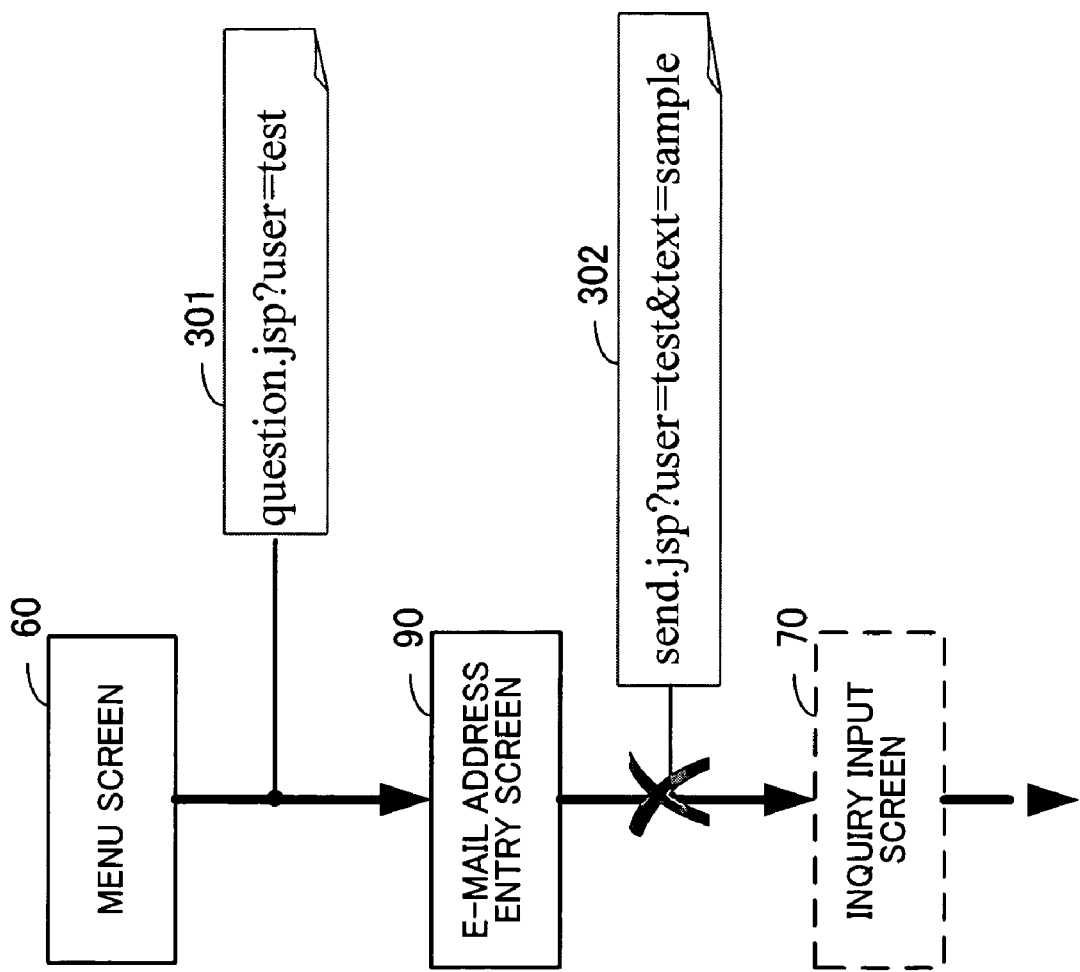
FIG. 25 shows a page reacquisition status after an e-mail address is deleted.

FIG. 25 shows a page reacquisition status after the e-mail address is deleted. As shown in FIG. 25, when the request 301 is sent from the menu screen 60, the page information of the e-mail address entry screen 90 is acquired. The e-mail address entry screen 90 does not include link information included in the inquiry input screen 70. Accordingly, the request 302 used to make a transition from the inquiry input screen 70 disregards the transition assumed by the web application. The web application will construe that an illegal request is made. The web server will send other page information such as an error page, instead of the page information of the inquiry input screen 70 which was assumed to be acquired as the response to the request 302.

If the repeatability judgment processing of this embodiment is not performed, the user would verify the web site based on wrong page information such as an error page. A verification based on wrong page information will produce a wrong result, decreasing the reliability of verification result.

If a different page is sent, this embodiment judges that there is no repeatability. As a result, the user knows that target page information cannot be obtained by the request sequence. The user will track down the cause of the absence of page repeatability and can reenter an e-mail address.

The user can automatically obtain the shortest request sequence to the inquiry input screen 70 by giving the shortest-request-sequence detection block 124 a request for detecting the shortest request sequence to the page class including the page information of the inquiry input screen 70. In the shown example, a request sequence via the e-mail address entry screen 90 can be obtained.

The user can also change the path (request sequence) for reacquiring a page. The shortest-request-sequence detection block 124 displays the page-class transition relationship 50*a* shown in FIG. 18, under the control of the user. If the user specifies a new path, the shortest-request-sequence detection block 124 stores the specified path as a new path for reacquiring the page.

According to this embodiment, the conformity of page information is judged by the assignment determination condition. If newly acquired page information has a high conformity with page information acquired earlier, further links will not be followed. This prevents redundant HTTP data from being collected.

An assignment determination condition is specified for each group, and the contents can be changed individually. Accordingly, the range of recognition of conformity can be specified for each group, and groups can be created as intended by the user. The input and output of a web application have a high degree of flexibility, except for the use of HTTP. With a fixed assignment determination condition including a comparison of URLs, the HTTP data may not be classified appropriately. According to this embodiment, the HTTP data can be classified with a high flexibility because the assignment determination condition can be changed in each group.

In addition, the user can change an assignment-determination-condition creation rule defined when a new group is created. Accordingly, an appropriate assignment determination condition can be automatically created, depending on the data structure of the web site to be verified. Web applications in a single web site may often be created in the same framework. The web applications are used in roughly the same manner. When the HTTP data of a web site is collected, a method of adding or updating an assignment determination condition associated with an addition of a new page class is specified appropriately for the framework, so that subsequent tasks such as changing the assignment determination condition can be performed efficiently.

Because the assignment determination condition uses a response status code, the difference between pages can be appropriately checked. If response status codes are different, the corresponding pages often have different contents. Accordingly, classification by response status code will be appropriate.

The assignment determination condition also uses the conformity of link information included in an acquired HTTP page, so that pages can be collected with improved efficiency. One purpose of page collection is to detect a page linked by the link information. The acquisition of identical pages linked by the same link information can be avoided by checking the conformity of the link information, so that the efficiency of page collection is improved.

Because a given query parameter and the other query parameters use different conformity judgment criteria such as conformity in the name or conformity in both the name and the value, page collection can be performed with improved efficiency. Some query parameters specify a value having a greater significance as a data value, such as a calendar date (/foo.cgi?date=value), and the other query parameters specify a value having a greater significance as a value of a conditional branch, such as a junction between viewing and editing (/bar.cgi?action=value).

If a query parameter specifies a value having a greater significance as a value of a conditional branch, the contents of the page to be acquired largely depend on the value in many cases. If a query parameter specifies a value such as a calendar date, pages collected with different values have high conformity. The need for referencing the value can be specified for each query parameter, so that acquisition of pages resembling one another can be avoided by not referencing the value of the query parameter. Accordingly, the efficiency of page collection is improved.

When a page is reacquired, the conformity to a page acquired earlier or the page repeatability is checked to prevent the web site from being verified by a wrong page. An HTTP request sequence for reacquiring a page may require a plurality of requests such as log-in or may require a single request for the target page. Whether the request sequence of acquisition is correct can be checked by judging the repeatability of the reacquired page. Accordingly, the reliability of the web-site verification processing can be improved.

Because the shortest request sequence for reacquiring a page can be detected, the efficiency of page reacquisition processing is improved.

The processing functions described above can be implemented by a computer. In that case, a program describing the contents of the processing of the functions required in the web-site verification apparatus 100 is given. When the program is executed by the computer, the processing functions are implemented on the computer. The program describing the contents of the processing can be recorded on a computer-readable storage medium. Computer-readable storage media include magnetic recording apparatuses, optical discs, magneto-optical recording media, and semiconductor memory. Magnetic recording apparatuses include a hard disk drive (HDD), a flexible disk (FD), and a magnetic tape. Optical disks include a digital versatile disc (DVD), a DVD-RAM, a compact disc read only memory (CD-ROM), a compact disc recordable (CD-R), and a compact disc rewritable (CD-RW). Magneto-optical recording media include magneto-optical disks (MO).

The program is distributed in the form of a portable recording medium storing the program, such as a DVD or a CD-ROM. The program can also be stored in a storage apparatus of a sever computer and can be transferred from the server computer to another computer via a network.

A computer for executing the program stores the program recorded on a portable recording medium or the program transferred from the server computer, in an internal storage apparatus. The computer reads the program from the internal storage apparatus and performs processing in accordance with the program. The computer can also read the program directly from the portable recording medium and can perform the processing in accordance with the program. Each time a program is transferred from the server computer, the computer can perform the processing in accordance with the transferred program.

According to the present invention, page information acquired in accordance with an assignment determination condition is checked to see which group it belongs to. If the acquired page information does not belong to any group, a page acquisition request based on the link information included in the page information is output. If a plurality of pages belonging to the same group is acquired, a page acquisition request based on the link information of the page stored first is output, and the contents of linked pages are acquired. Accordingly, collection of pages linked from a plurality of pages having high conformity can be avoided, and necessary pages can be collected efficiently.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A computer-readable storage medium having recorded thereon a page information collection program for collecting a set of pages associated by link information from a server on a network, the page information collection program causing a computer to execute the processing of:

acquiring contents of a page through the network in response to a page acquisition request and creating page information including the contents of the page and a response status code used for page acquisition, the creating the page information being automatically performed without user interaction;

taking the page information created as target page information, comparing an assignment determination condition defining the requirements of page information to be included in each group and the target page information, to find a group having the assignment determination condition satisfied by the target page information, and storing the target page information put into the group in a storage block, the comparing the assignment determination condition being automatically performed without user interaction;

creating an assignment determination condition satisfied by the target page information if the target page information does not satisfy the assignment determination condition of any group, creating a group corresponding to the created assignment determination condition, and storing the target page information put into the created group in the storage block the creating the assignment determination condition and the creating the group being automatically performed without user interaction; and extracting the link information only from the target page information put first into the group created and outputting the page acquisition request for acquiring the page based on the extracted link information, the extracting the link information and the outputting the page acquisition request being automatically performed without user interaction, wherein the link information is not extracted from the target page information put into already existing groups;

wherein the assignment determination condition includes a URL and an option to select a query conformity field;

wherein the assignment determination condition defines a requirement concerning the conformity of the page acquisition request and the response status code given when the contents of the page are acquired, the assignment determination condition is specific to each group, and contents of the assignment determination condition are individually changeable; and wherein in the comparing the assignment determination condition and the target page information, page information acquired by different page acquisition requests and having different response status codes is determined to belong to different groups.

2. The computer-readable storage medium according to claim 1, causing the computer to execute further the processing of:

creating the new assignment determination condition under a predefined assignment-determination-condition creation rule.

3. The computer-readable storage medium according to claim 2, causing the computer to execute further the processing of:

changing the contents of the assignment-determination-condition creation rule under the control of the user.

4. The computer-readable storage medium according to claim 1, causing the computer to execute further the processing of:

changing the contents of the assignment determination condition under the control of the user.

5. The computer-readable storage medium according to claim 1, wherein the assignment determination condition defines a requirement concerning the conformity of link information included in the contents of the page.

6. The computer-readable storage medium according to claim 5, wherein the requirement concerning the conformity of link information includes a requirement of assignment to the group, concerning a query parameter having a predetermined name, being the conformity in both the query parameter name and the value, and another requirement of assignment to the group, concerning the other query parameters, being the conformity in the query parameter name.

7. The computer-readable storage medium according to claim 1, causing the computer to execute further the processing of:

referencing reacquisition path information indicating the sequence of link information to be followed when acquiring the page information which was acquired before, and reacquiring the page information by following the link information along the path according to the reacquisition path information.

8. The computer-readable storage medium according to claim 7, causing the computer to execute further the processing of:

classifying the page information reacquired, checking whether the page information is put into the same group as the page information acquired before by the same request, and outputting the result.

9. The computer-readable storage medium according to claim 8, causing the computer to execute further the processing of:

reacquiring the page information by following one or more paths from the base page to the page acquired before in response to a shortest-path detection request and determining a path including the smallest number of page acquisitions among the paths by which the page information in the same group was acquired before by the same request, as the reacquisition path.

10. A page information collection method for collecting a set of pages associated by link information, from a server on a network, the page information collection method comprising:

acquiring contents of a page through the network in response to a page acquisition request and creating page information including the contents of the page and a response status code used for page acquisition, the creating the page information being automatically performed without user interaction;

taking the page information created as target page information, comparing an assignment determination condition defining the requirements of page information to be included in each group and the target page information, to find a group having the assignment determination condition satisfied by the target page information, and storing the target page information put into the group in a storage block, the comparing the assignment determination condition being automatically performed without user interaction;

creating an assignment determination condition satisfied by the target page information if the target page information does not satisfy the assignment determination condition of any group, creating a group corresponding to the created assignment determination condition, and storing the target page information put into the created group in the storage block, the creating the assignment determination condition and the creating the group being automatically performed without user interaction; and extracting the link information only from the target page information put first into the group created and outputting the page acquisition request for acquiring the page based on the extracted link information, the extracting the link information and the outputting the page acquisition request being automatically performed without user interaction, wherein the link information is not extracted from the target page information put into already existing groups;

wherein the assignment determination condition includes a URL and an option to select a query conformity field;

wherein the assignment determination condition defines a requirement concerning the conformity of the page acquisition request and the response status code given when the contents of the page are acquired, the assignment determination condition is specific to each group, and contents of the assignment determination condition are individually changeable; and wherein in the comparing the assignment determination condition and the target page information, page information acquired by different page acquisition requests and having different response status codes is determined to belong to different groups.

11. A page information collection apparatus for collecting a set of pages associated by link information, from a server on a network, the page information collection apparatus comprising:

a page acquisition means for acquiring the contents of a page through the network in response to a page acquisition request and creating page information including contents of the page and a response status code used for page acquisition, the creating the page information being automatically performed without user interaction;

a classification means for taking the page information created by the page acquisition means as target page information, comparing an assignment determination condition defining the requirements of page information to be included in each group and the target page information, to find a group having the assignment determination condition satisfied by the target page information, and storing the target page information put into the group in a storage means, the comparing the assignment determination condition being automatically performed without user interaction;

a grouping means for creating an assignment determination condition satisfied by the target page information if the target page information does not satisfy the assignment determination condition of any group, creating a group corresponding to the created assignment determination condition, and storing the target page information put into the created group in the storage means, the creating assignment determination condition and the creating the group being automatically performed without user interaction; and a page acquisition request means for extracting the link information only from the target page information put first into the group created by the grouping means and outputting the page acquisition request for acquiring the page based on the extracted link information to the page acquisition means, the extracting the link information and the outputting the page acquisition request being automatically performed without user interaction, wherein the link information is not extracted from the target page information put into already existing groups;

wherein the assignment determination condition includes a URL and an option to select a query conformity field;

wherein the assignment determination condition defines a requirement concerning the conformity of the page acquisition request and the response status code given when the contents of the page are acquired, the assignment determination condition is specific to each group, and contents of the assignment determination condition are individually changeable; and wherein in the comparing the assignment determination condition and the target page information, page information acquired by different page acquisition requests and having different response status codes is determined to belong to different groups.

* * * * *